US012042468B2

(12) United States Patent
Dadachanji et al.

(10) Patent No.: US 12,042,468 B2
(45) Date of Patent: Jul. 23, 2024

(54) TRAY FOR POSITIONING A MEDICAL VIAL TOGETHER WITH A VIAL ADAPTER IN A FIXED POSITIONAL RELATIONSHIP RELATIVE TO EACH OTHER AND PACKAGING UNIT COMPRISING THE SAME

(71) Applicant: KAIRISH INNOTECH Private Ltd., Mumbai (IN)

(72) Inventors: Rishad Kairus Dadachanji, Mumbai (IN); Pratul Prakash Potdar, Daman & Diu (IN); Keyurkumar Arvindbhai Patel, Daman & Diu (IN); Krupal Ashokbhai Chudasma, Gujarat (IN)

(73) Assignee: KAIRISH INNOTECH Private Ltd., Mumbai (IN)

( * ) Notice: Subject to any disclaimer, the term of this patent is extended or adjusted under 35 U.S.C. 154(b) by 200 days.

(21) Appl. No.: 17/845,424

(22) Filed: Jun. 21, 2022

(65) Prior Publication Data

US 2022/0409485 A1 Dec. 29, 2022

(30) Foreign Application Priority Data

Jun. 29, 2021 (IN) ............................ 202121029262

(51) Int. Cl.
*A61J 1/20* (2006.01)
*A61B 50/00* (2016.01)
(Continued)

(52) U.S. Cl.
CPC ............... *A61J 1/16* (2013.01); *A61J 1/1406* (2013.01); *A61J 1/201* (2015.05); *A61J 1/2048* (2015.05);
(Continued)

(58) Field of Classification Search
CPC ... A61B 18/18; A61J 1/16; A61J 1/201; A61J 1/2048; A61J 1/2055; A61J 1/2065;
(Continued)

(56) References Cited

U.S. PATENT DOCUMENTS 1,435,622 A 11/1922 Price
3,318,596 A 5/1967 Herzog
(Continued)

FOREIGN PATENT DOCUMENTS

CH 139353-0001 12/2012
CN 305445293 11/2019
(Continued)

OTHER PUBLICATIONS

First Examination Report for corresponding Indian Application No. 202121029262 dated Jan. 19, 2022.
(Continued)

*Primary Examiner* — Gideon R Weinerth
(74) *Attorney, Agent, or Firm* — Renner, Otto, Boisselle & Sklar, LLP

(57) ABSTRACT

A tray for positioning, in a fixed positional relationship, a medical vial 7 together with a vial adapter 4 is disclosed. A tray member 10 includes a vial accommodation cavity 11 and a vial adapter accommodation cavity 12, each comprises retaining members 19, 37*a*, 37*b*, 35*a*, 35*b*, 36*a*, 36*b* configured to position the vial adapter 4 and the vial 7 spaced apart from each other and in axial alignment in an intermediate position. The retaining members 19, 37*a*, 37*b*, 35*a*, 35*b*, 36*a*, 36*b* are further configured to guide a relative axial movement of the vial 7 and vial adapter 4 from the intermediate position to a transfer position while maintaining the axial alignment of the vial 7 with the vial adapter 4. In the
(Continued)

Figure 1B:
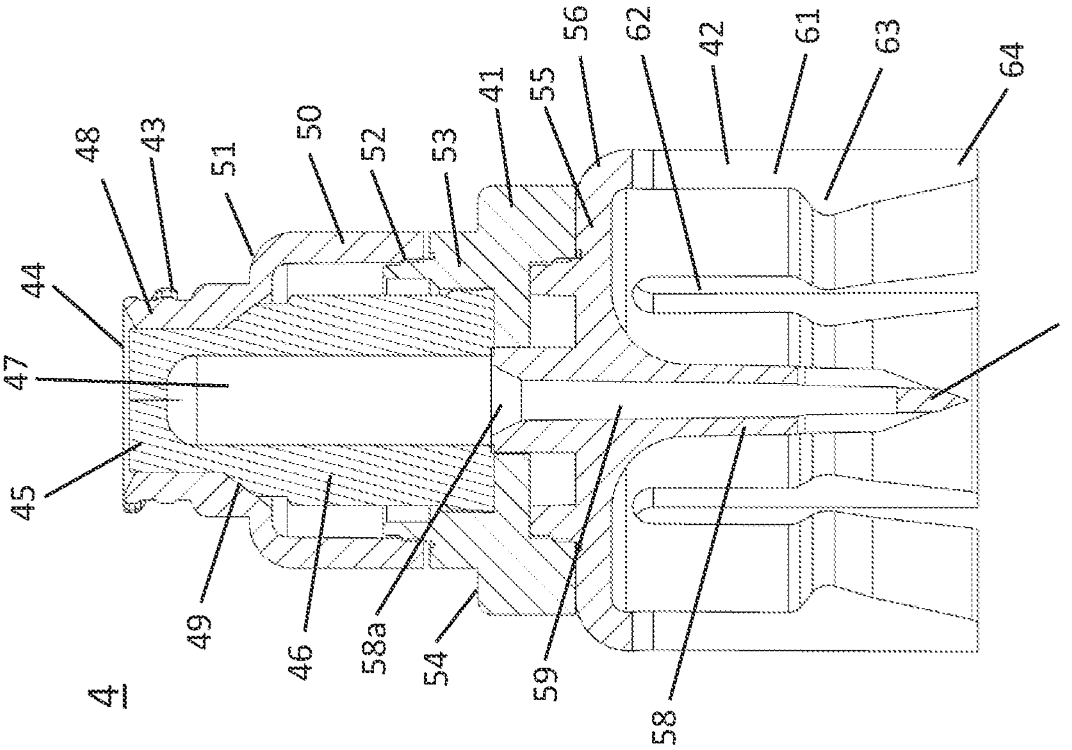

transfer position the vial adapter 4 is locked to the vial 7 and a piercing mandrel 57 pierces a vial stopper 76 for liquid transfer.

42 Claims, 30 Drawing Sheets

(51) Int. Cl.
*A61B 50/30* (2016.01)
*A61J 1/14* (2023.01)
*A61J 1/16* (2023.01)

(52) U.S. Cl.
CPC ............ *A61J 1/2065* (2015.05); *A61J 1/2089* (2013.01); *A61J 1/2096* (2013.01)

(58) Field of Classification Search
CPC ...... A61J 1/2089; A61J 1/2096; A61J 1/1406; A61M 5/1782; A61M 5/002; A61M 2005/2433; B65B 3/003; B65B 55/027; B65D 81/3211; B65D 81/3216; A61L 2202/182
USPC ........ 141/375, 383; 206/570, 363, 438, 471, 206/364, 365; 604/88, 411, 414, 415, 604/416, 403
See application file for complete search history.

(56) References Cited

U.S. PATENT DOCUMENTS 3,853,158 A 12/1974 Whitty
4,645,073 A * 2/1987 Homan ................. A61J 1/2096 604/416
5,013,155 A 5/1991 Rybak
5,163,557 A 11/1992 Sokolowski
5,247,972 A * 9/1993 Tetreault ............. A61M 5/1782 604/905
D339,983 S 10/1993 Breton et al.
5,390,792 A 2/1995 Van Ness et al.
5,449,071 A 9/1995 Levy
5,485,917 A * 1/1996 Early ..................... A61B 50/30 206/363
D378,613 S 3/1997 Sundstrom
5,743,312 A * 4/1998 Pfeifer .................. A61J 1/2089 604/416
5,873,859 A * 2/1999 Muntz ................... A61J 1/2096 604/407
5,894,870 A * 4/1999 Maxwell ............... A61J 1/2096 141/330
6,006,798 A 12/1999 Lindquist
6,010,663 A 1/2000 Bachand
6,162,199 A * 12/2000 Geringer ............. A61M 5/1782 604/407
6,228,324 B1 * 5/2001 Hasegawa ............... A61L 2/208 604/199
6,256,817 B1 7/2001 McGuire et al.
6,581,648 B1 6/2003 Zolentroff et al.
6,729,370 B2 5/2004 Norton et al.
6,915,901 B2 7/2005 Feinberg et al.
6,997,916 B2 2/2006 Simas, Jr. et al.
D598,538 S 8/2009 Yeakley
D608,015 S 1/2010 Sandel
D615,207 S 5/2010 Bochner et al.
7,758,560 B2 * 7/2010 Connell ................ A61M 5/162 222/1
D627,645 S 11/2010 Ma et al.
7,896,442 B2 3/2011 White
7,985,375 B2 7/2011 Edens et al.
8,083,058 B2 * 12/2011 Marcinkowski ....... B65D 77/26 53/484
8,172,824 B2 * 5/2012 Pfeifer .................. A61J 1/2089 604/416
D673,261 S 12/2012 Rapoport et al.
8,360,114 B2 1/2013 Clark
8,449,521 B2 * 5/2013 Thorne, Jr. ............... A61J 1/16 604/407
8,752,598 B2 * 6/2014 Denenburg ........... A61J 1/2096 141/105
8,757,383 B2 * 6/2014 Numata .............. A61M 25/002 206/557
D721,179 S 1/2015 Matsuda
D723,180 S 2/2015 Klein
D734,868 S 7/2015 Gilboa
9,381,311 B2 7/2016 Holakovsky et al.
9,456,956 B1 * 10/2016 Webster .................. A61L 2/081
9,522,097 B2 * 12/2016 Tennican ............. A61J 1/2096
D788,936 S 6/2017 Schill et al.
D788,937 S 6/2017 Schill et al.
9,828,157 B2 * 11/2017 Roesler .................. A61B 50/33
D810,585 S 2/2018 Kim et al.
D836,355 S 12/2018 Schindhelm
10,350,141 B2 7/2019 Metz
10,577,165 B2 * 3/2020 Sadowski ............. A61B 50/30
D884,886 S 5/2020 Kangastupa
D887,577 S 6/2020 Shor et al.
D895,145 S 9/2020 Smith et al.
D905,235 S 12/2020 Mottola et al.
D906,815 S 1/2021 Yu
D906,816 S 1/2021 Yu
10,889,421 B2 * 1/2021 Kaplan ................ A61F 2/0095
D911,068 S 2/2021 Helmick
D918,032 S 5/2021 Smith et al.
D923,171 S 6/2021 Miazga
11,033,459 B2 6/2021 Ariagno et al.
11,160,918 B2 * 11/2021 Cook ...................... B65B 69/00
11,273,298 B2 3/2022 Erekovcanski et al.
D960,308 S 8/2022 Ketterling
11,542,136 B1 * 1/2023 May .......................... A61J 1/16
D983,366 S 4/2023 Dadachanji et al.
D983,997 S * 4/2023 Dadachanji .................. D24/227
D1,011,552 S * 1/2024 Dadachanji .................. D24/227
D1,013,206 S * 1/2024 Dadachanji .................. D24/227
2006/0079834 A1 4/2006 Tennican et al.
2010/0282636 A1 * 11/2010 Roberts .............. B65D 81/3453 206/561
2011/0155608 A1 * 6/2011 Foster .................... A61B 50/20 206/466
2012/0037266 A1 * 2/2012 Bochenko ............. A61J 1/2096 604/404
2012/0059346 A1 * 3/2012 Sheppard .............. A61J 1/2096 604/414
2012/0277715 A1 * 11/2012 Ariagno .................... A61J 1/16 604/416
2014/0058213 A1 2/2014 Abu-Tarif et al.
2016/0206510 A1 * 7/2016 Carrel ................... A61J 1/1406
2016/0375199 A1 * 12/2016 Ward .................. A61M 5/3202 604/506
2017/0156983 A1 6/2017 Tennican
2018/0325775 A1 11/2018 David et al.
2019/0262231 A1 * 8/2019 Bochenko ................. A61J 1/03
2019/0321262 A1 * 10/2019 Chudek ................. A61J 1/2082
2021/0154391 A1 * 5/2021 Tennican ......... G06K 19/06028
2021/0228122 A1 7/2021 Wilkinson et al.
2021/0379596 A1 12/2021 Peechatka et al.
2022/0409485 A1 * 12/2022 Dadachanji ........... A61J 1/2089
2024/0024198 A1 * 1/2024 Hammershøj ........ A61J 1/2096
2024/0024200 A1 * 1/2024 Dadachanji ........... A61J 1/2089

FOREIGN PATENT DOCUMENTS

CN 305445300 11/2019
CN 305937152 7/2020
EM 002389718-0001 1/2014
EM 006376182-0001 4/2019
EM 006376182-0002 4/2019
EM 006376182-0003 4/2019
EM 006376182-0004 4/2019
EM 006523825-0003 5/2019
EM 006523825-0004 5/2019
IN 349263-001-0001 11/2021

(56) References Cited

FOREIGN PATENT DOCUMENTS

| | | | |
|---|---|---|---|
| IN | 345663-001-0001 | | 4/2022 |
| IN | 346307-001 | | 5/2022 |
| JP | 6014868 | B2 | 10/2016 |
| KR | 300745291 | | 5/2014 |
| KR | 300746691 | | 6/2014 |
| KR | 301033636 | | 11/2019 |
| WO | 2004064706 | A2 | 8/2004 |
| WO | D216301-001 | | 9/2021 |

OTHER PUBLICATIONS

Search Report for Corresponding European Application No. 21190976.7 dated Feb. 4, 2022.
Office Action for corresponding U.S. Appl. No. 29/800,606 mailed Dec. 9, 2022.
Air Medical Pin IV Infusion Mini Non Vented Spike Valves Vial Adapter With Filter. Online, published date unknown. Retrieved on Nov. 23, 2022 from URL: https://www.alibaba.com/product-detail/Air-Medical-Pin-IV-Infusion-Mini_62002602020. html.
First Office Action for related U.S. Appl. No. 29/810,540 mailed Apr. 13, 2023.
First Office Action for related U.S. Appl. No. 29/810,541 mailed Jun. 26, 2023.
First Office Action for related U.S. Appl. No. 29/790,918 mailed Jun. 8, 2023.

* cited by examiner

TRAY FOR POSITIONING A MEDICAL VIAL TOGETHER WITH A VIAL ADAPTER IN A FIXED POSITIONAL RELATIONSHIP RELATIVE TO EACH OTHER AND PACKAGING UNIT COMPRISING THE SAME

CROSS-REFERENCE TO RELATED APPLICATION

The present invention claims priority of Indian patent application no. 202121029262 “Tray For Positioning A Medical Vial Together With A Vial Adapter In A Fixed Positional Relationship Relative To Each Other And Packaging Unit Comprising The Same”, filed on Jun. 29, 2021, the whole content of which is hereby incorporated by reference.

FIELD OF INVENTION

The present invention generally relates to drug delivery devices and containers, and more specifically relates to a tray for positioning a vial for medical or pharmaceutical applications together with a vial adapter in a fixed positional relationship relative to each other to enable the coupling of the vial adapter to the vial for liquid transfer in a simple manner. The present invention also relates to a packaging unit including such a tray, which packages a vial and a vial adapter, preferably under sterile conditions.

BACKGROUND OF INVENTION

Trays and sterile packaging units for medical devices and storage containers, such as vials made of glass of plastic material, are well-known from the prior art.

Examples for such trays and methods for manufacturing thereof are disclosed e.g. in U.S. Pat. Nos. 4,730,726, 5,108,530, 5,165,539, 5,353,930 and 5,44,9071, and such trays may be made of plastic material e.g. by vacuum thermoforming or pressure thermo-forming of a thin plastic sheet or by means of plastic injection molding. Such trays may also include locking features for either locking lids of the tray with each other or locking a medical device or a storage container inside a cavity of the tray in order to provide a fixed position of the medical device or storage container during storage in the tray.

For the transfer of a liquid out of and/or into a vial, various transfer devices and assemblies are known from the prior art. Such transfer devices or assemblies will usually include locking members for locking the device or assembly to the front end of a vial in a transfer position and a piercing mandrel or similar stopper puncturing member to pierce or puncture, in the transfer position, an elastomeric stopper sealing the opening of the vial, for enabling the transfer of a liquid out of and/or into the vial. For medical applications, at least the transfer devices or assemblies need to be packaged under sterile conditions, whereas the upper surface of the vial stopper could be disinfected prior to actual use, e.g. by a swab. Ensuring sterile conditions makes, however, the handling of such transfer devices and assemblies difficult.

U.S. Pat. No. 8,752,598 B2 discloses an example of a liquid drug transfer assembly including a drug vial adapter having a drug vial adapter skirt, an upright drug vial adapter port and a drug vial adapter sleeve downward depending opposite the upright drug vial adapter port and in flow communication therewith. For enabling the transfer of a drug liquid, the drug vial adapter is slidingly disposed on the drug vial stopper puncturing member such that on mounting the liquid drug transfer assembly on the drug vial, the drug vial stopper puncturing member punctures the drug vial stopper to form a throughgoing puncture bore and the drug vial adapter sleeve lines the puncture bore. The drug vial adapter is packaged under sterile conditions in a special blister pack having a protective foil. Before removing the protective foil from the underside of the blister pack and positioning the drug vial adapter onto the front end of a vial, the upper surface of the vial stopper needs to be disinfected.

U.S. Pat. No. 10,278,897 B2 discloses in FIG. 2 a similar blister pack for a liquid drug transfer assembly.

In medical applications, it is usually desirable to prevent the patient from being exposed to the fluid which is being injected to or extracted from the patient, and it is desirable to insulate nurses and doctors from exposure to the liquid which may contain the patient’s blood or waste products.

For enabling an efficient needleless or needle-free coupling of a syringe with a vial, US 2017/0143586 A1 discloses a similar vial adapter comprising an outer thread for a Luer lock thread of a syringe so that the vial adapter.

Often the male component of the syringe used to inject or withdraw the fluid, retains some of the fluid on the tip thereof, thus providing a risk to nurses and doctors of being exposed to the fluid. Wiping off this fluid prior to disconnecting the syringe is highly desirable. For enabling a safe and efficient wiping off of fluid in such applications, U.S. Pat. No. 6,651,956 B2 discloses a valve which includes a stem having a slit at an end thereof. The valve stem is located in a valve body and is deformable. When a tip of a syringe is engaged with the slit in the stem, the stem shifts in the valve body, a top portion thereof folds inward and the slit seals against the instrument and allows liquid to flow through the stem, to or from the instrument. When the tip of the syringe is removed again, the surface of the valve stem will not be contaminated with liquid.

Integrating such a valve stem into a vial adapter of the kind discussed above is also known from the prior art.

SUMMARY OF INVENTION

It is an object of the present invention to provide safe and reliable solutions for enabling an efficient coupling of a medical device, such as a syringe, with a medical vial used for medical or pharmaceutical applications.

According to the present invention there is provided a tray for positioning a vial for medical or pharmaceutical applications together with a vial adapter in a fixed positional relationship relative to each other, said vial adapter comprising a piercing mandrel and being configured to be locked to a front end of the vial in a transfer position in which the piercing mandrel pierces a stopper of the vial for transfer of a liquid out of and/or into the vial, said tray comprising: a tray member having a vial cavity for accommodating at least a portion of the vial and a vial adapter cavity for accommodating at least a portion of the vial adapter, wherein the vial adapter cavity and the vial cavity each comprises retaining members, which are configured to position the vial adapter and the vial in an intermediate position, in which the vial adapter is positioned in a fixed position and predetermined orientation while the vial is positioned spaced apart from the vial adapter and in axial alignment with the vial adapter, wherein the retaining members further configured to guide a relative movement of the vial and vial adapter from the intermediate position to the transfer position while maintaining the axial alignment of the vial and vial adapter with each other.

The tray thus can be used as a jig, gauge or caliber to define the positional relationship between the vial adapter and vial in the intermediate position and to keep them in axial alignment during the transfer from the intermediate position to the transfer position. From the intermediate position the transfer position can be accomplished by a simple axial displacement of the vial and/or vial adapter, i.e. a displacement only in axial direction. In the transfer position, the vial adapter is locked to the front end of the vial and the piercing mandrel of the vial adapter pierces the vial stopper for liquid transfer, namely for enabling the transfer of liquid out of and/or into the vial, e.g. for administering a liquid solution stored in the vial.

The intermediate position may be identical with a storage position in which the vial and vial adapter are stored in the tray over an extended period of time. According to further embodiments, however, the storage position is different to the intermediate position, and it is also conceived that the tray is not used for long-time storage of the vial and/or vial adapter, but that the tray is used only for positioning the vial and vial adapter relative to each other short time before effecting the axial displacement of the vial and/or vial adapter from the intermediate position to the transfer position. The vial being positioned 'spaced apart from the vial adapter' shall mean in particular that the piercing mandrel does not yet contact the vial stopper, and that preferably a certain gap exists between the vial adapter and vial in the intermediate position.

In the intermediate position the vial and vial adapter are positioned in axial alignment with each other, which shall mean that the axial center lines of the vial and vial adapter, which are each generally of cylindrical shape, generally coincide. Of course, minor deviations from a perfect axial alignment between the vial and vial adapter may exist in the intermediate position, and most important is that the relative movement between of the vial and vial adapter is guided in such a manner that the piercing mandrel starts piercing or puncturing the vial stopper at its central piercing portion and the piercing mandrel remains centered during the further relative movement from the intermediate position to the transfer position. The main purpose of the tray is thus to enable a sufficient centering effect so that the piercing mandrel will pierce or puncture the vial stopper at a central position and so that the vial adapter can be properly locked to the front end of the vial.

For the transfer from the intermediate position to the transfer position, it is preferred if only one of the vial and vial adapter is moved relative to the other. Most preferably, the vial adapter is kept stationary by means of the tray, whereas the vial is moved in axial direction towards the vial adapter until finally the vial adapter is locked to the front end of the vial. Of course, however, also the vial may be kept stationary by means of the tray, whereas the vial adapter is moved in axial direction towards the vial. Any 'mixed' axial displacement between the afore-mentioned extreme cases may also be accomplished by means of the tray according to the present invention.

'Maintaining the axial alignment of the vial and vial adapter with each other' during the transfer from the intermediate position to the transfer position, of course, shall allow a certain misalignment between the vial and vial adapter, e.g. a minor lateral displacement, as long as a the tray enables a sufficient centering effect so that the piercing mandrel will pierce or puncture the vial stopper at a central position and so that the vial adapter can be properly locked to the front end of the vial.

The cavities of the tray member are preferably sufficiently deep so that the vial adapter and vial each does not protrude beyond an upper surface of the tray member, when the vial adapter and vial is accommodated inside the vial adapter cavity and vial cavity, respectively, so that e.g. a packaging foil may be bonded to the upper surface of the tray member to provide a packaging unit. Both cavities are generally of cylindrical shape, corresponding to the outer profile of the vial adapter and vial, respectively. Preferably, the vial adapter cavity is large enough to fully accommodate the vial adapter in the intermediate position, whereas a portion of the vial may extend beyond a front end of the vial cavity in the intermediate position, e.g. being exposed in an intermediate cavity between the vial adapter cavity and vial cavity for enabling access to the vial body with the fingers of a user or grippers of a robot.

Preferably the tray member has a planar upper surface, wherein the vial cavity and the vial adapter cavity is each open toward the planar upper surface of the tray member. Thus, both cavities can be easily sealed, e.g. by adhesive bonding of a packaging foil on the planar upper surface of the tray member. The planar upper surface of the tray member preferably encircles both cavities, i.e. the vial cavity and the vial adapter cavity, so that both cavities can be sealed sterile against the environment, if required, and the tray can be used for long-time storage of the vial and vial adapter.

According to the present invention, the retaining members may each be formed simply by a bottom of the vial cavity and vial adapter cavity itself. The bottoms of the cavities then serve for establishing the axial alignment between the vial and vial adapter in the intermediate position and maintaining this axial alignment during the transfer from the intermediate position to the transfer position. During the transfer from the intermediate position to the transfer position, the bottoms of the cavities will then also be used for guiding the relative movement of the vial and vial adapter. Preferably, the bottoms of the cavities are each curved corresponding to the outer profile of the vial and vial adapter, respectively.

According to a further embodiment, the retaining members comprise pairs of protrusions formed on opposite side-walls of the vial adapter cavity and vial cavity, respectively, which are configured for contacting side-surfaces of the vial adapter and vial, respectively, for positioning the vial adapter and vial. By contacting side-surfaces of the vial adapter and vial, respectively, the protrusions may control and keep constant the level of the vial and vial adapter, respectively, in the tray member during the transfer from the intermediate position to the transfer position. The retaining members, particularly the protrusions, may retain the vial and vial adapter in the vial cavity and vial adapter cavity, respectively, in a positive-fit manner. Such a positive fit may be sufficient to also fix the axial positions of the vial and vial adapter, respectively, in the intermediate position. When the vial and/or vial adapter is moved in axial direction for the transfer from the intermediate position to the transfer position, a certain friction between the retaining members and the vial/vial adapter may be caused. However, such friction is low enough to enable a sliding movement of the vial/vial adapter from the intermediate position to the transfer position without exerting high axial forces.

According to a further embodiment, a height of contact regions of the protrusions with the side-surfaces of the vial adapter and vial, respectively, above a bottom of the vial adapter cavity and vial cavity, respectively, is larger than the height of a center line of the vial adapter and vial above the bottom of the vial adapter cavity and vial cavity. The protrusions may thus serve to delimit the level of the vial and vial adapter, respectively, in a direction perpendicular to their axial direction, for preventing a significant lateral displacement of the vial and vial adapter, respectively, in the direction perpendicular to their axial direction during the transfer from the intermediate position to the transfer position, to thereby maintain the axial alignment, as outlined above.

According to a further embodiment, the opposite side-walls on which the protrusions are formed are each upright and planar side-walls. Thus, the vial and vial adapter can each be accommodated in cylindrical volumes formed between the bottom of the respective cavity and associated protrusion. Preferably, the upright and planar side-walls are a little flexible so that the protrusions can move a little outward when the vial and vial adapter are inserted from above into the respective cavity. And preferably, the upright and planar side-walls will then flex back to their home position once the vial and vial adapter has been inserted from above into the respective cavity, to secure the level of the vial and vial adapter, respectively.

According to a further embodiment, the vial cavity comprises at least two pairs of protrusions formed on opposite side-walls of the vial cavity, and at least one pair of protrusions is still in contact with side-surfaces of the vial in the transfer position. The at least one pair of protrusions may then be used for guiding the relative movement of vial and vial adapter and maintain the centering effect even at the final stage of the transfer from the intermediate position to the transfer position.

According to a further embodiment, the tray member further comprises guiding protrusions for maintaining the axial alignment between the vial and vial adapter during the relative movement between the vial and the vial adapter in the cavities from the intermediate position to the transfer position. These guiding protrusions may be different to the afore-mentioned retaining members to that the centering effect and guiding effect can be accomplished by means of different parts of the tray member.

According to a further embodiment, a bottom of the vial cavity is curved with a radius of curvature corresponding to an outer radius of a vial body of the vial and the profile of a bottom of the vial adapter cavity corresponds to an outer profile of the vial adapter, so that the bottoms of the cavities can be used directly as retaining members, as outlined above.

According to a further embodiment, the vial cavity further comprises axial position limiting members configured for delimiting an axial movement of the vial inside the vial cavity in the storage position. The axial position of the vial can thus be defined precisely and in a simple manner, in order to ensure that the vial and vial adapter are spaced apart from each other in the intermediate position. These axial position limiting members may be formed as protrusions on the bottom and/or side-walls of the vial cavity and/or vial adapter cavity. Preferably, the axial position limiting members are formed integrally with the bottom and/or side-walls of the vial cavity and/or vial adapter cavity.

According to a further embodiment, the axial position limiting members are more flexible than the retaining members of the vial cavity. When the vial slides over the axial position limiting members during the transfer from the intermediate position to the transfer position, the axial position limiting members will thus not cause a significant displacement of the vial in a direction perpendicular to the axial direction of the vial.

According to a further embodiment, the vial adapter has a stepped outer contour and the vial adapter cavity comprises a plurality of cavities of different widths and a plurality of stop surfaces that delimit an axial displacement of the vial adapter away from the vial by abutment with the stepped outer contour of the vial adapter.

According to a further embodiment, the tray member further comprises an intermediate cavity formed between the vial adapter cavity and the vial cavity, wherein a bottom end of the vial adapter is spaced apart from the front end of the vial in the intermediate position. The intermediate cavity may thus enable a certain minimum axial distance between the vial and vial adapter in the intermediate position, so that the outer surface of the vial stopper may be disinfected by means of a sterilizing swab before the transfer from the intermediate position to the transfer position.

According to a further embodiment, the intermediate cavity comprises a portion that is sufficiently wide to enable access to a vial body of the vial by means of fingers of a user or by means of grippers or the like of a robot in the intermediate position, for driving the relative movement of the vial and vial adapter, and/or for removal of the vial together with the vial adapter locked to the front end of the vial in the transfer position from the tray member by means of fingers of a user or grippers of a robot.

According to a further embodiment, the tray member further comprises a rear end cavity, where a bottom of the vial is sufficiently exposed to enable access to the bottom for a finger of a user or a manipulation member of a robot for driving the axial movement of the vial from the intermediate position to the transfer position.

According to a further embodiment, the tray member is made of plastic material, in particular by vacuum thermo-forming or pressure thermo-forming of a plastic sheet or by means of plastic injection molding. Or the tray member may be made of paper or cardboard with a thin film of plastic or bioplastic arranged on inner surfaces of the vial adapter cavity and vial cavity. Or the tray member is simply made of paper or cardboard without a thin film of plastic or bioplastic arranged on inner surfaces of the vial adapter cavity and vial cavity. Preferably, the retaining members are formed integrally with the tray member.

According to a further embodiment, the tray member may comprise a vial adapter tray member having a vial adapter storage cavity for long-time storage of the vial adapter, wherein the vial adapter storage cavity and the vial adapter cavity is each configured for enabling a transfer of the vial adapter from the vial adapter storage cavity into the vial adapter cavity to position the vial adapter in the intermediate position.

According to a further embodiment, the vial adapter tray member may be connected with the tray member via a hinge so that the vial adapter tray member can be pivoted about the hinge for positioning the vial adapter storage cavity vertical above the vial adapter cavity for enabling a transfer of the vial adapter from the vial adapter storage cavity into the vial adapter cavity to position the vial adapter in the intermediate position.

According to a further embodiment, the vial adapter tray member is a tray member insert that includes the vial adapter cavity and is configured to be inserted into a positioning cavity of the tray member as an independent member, and wherein, when the tray member insert is inserted into the positioning cavity of the tray member, the vial adapter is positioned in the intermediate position.

According to a further embodiment, the tray member insert comprises locking means for locking the tray member insert to the tray member, for positioning the tray member insert in the positioning cavity of the tray member.

According to a further aspect of the present invention there is provided a packaging unit for packaging a vial for medical or pharmaceutical applications together with a vial adapter, comprising a tray member as outlined above, and a packaging foil, wherein the vial adapter is accommodated in the vial adapter cavity, the vial is accommodated at least partially in the vial cavity so that it is spaced apart from the vial adapter and in axial alignment with the vial adapter, and the tray member is sealed by the packaging foil. The packaging unit may be used for sterile packaging the vial and vial adapter.

According to a further embodiment, the tray member comprises a planar upper surface and the packaging foil is adhesively bonded to the upper surface of the tray member.

According to a further embodiment, the vial adapter storage cavity is sealed by a second packaging foil. Preferably, the vial adapter storage cavity is sterile sealed by a second packaging foil.

OVERVIEW ON DRAWINGS

Figure 1A:
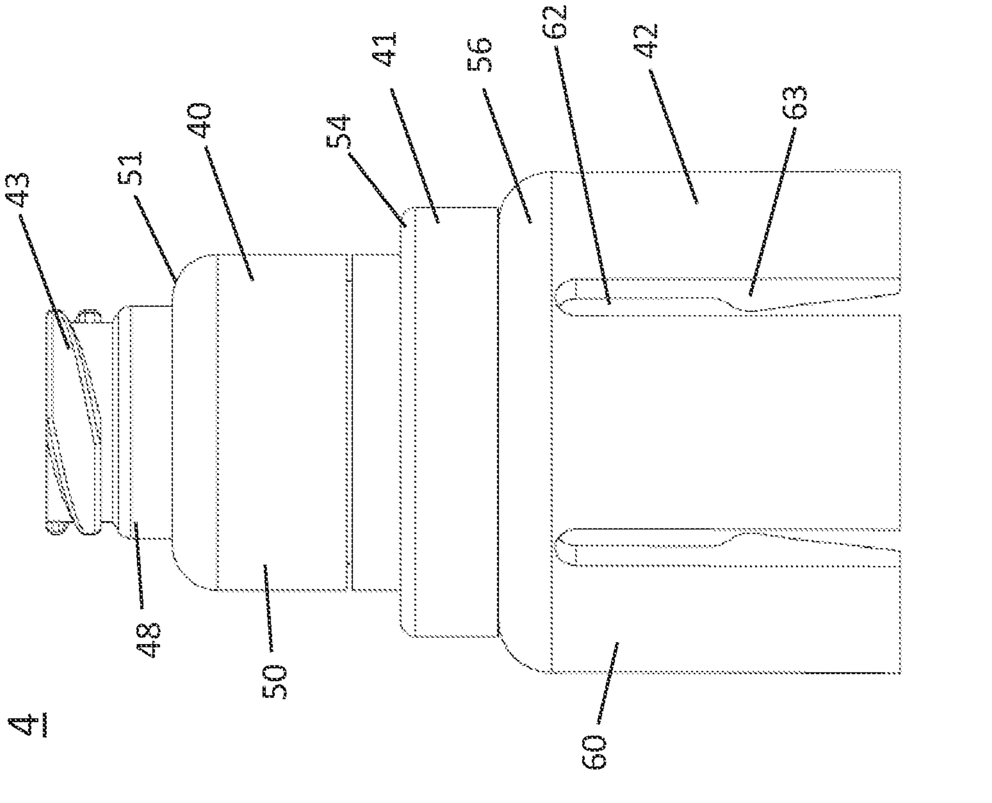
Figure 1C:
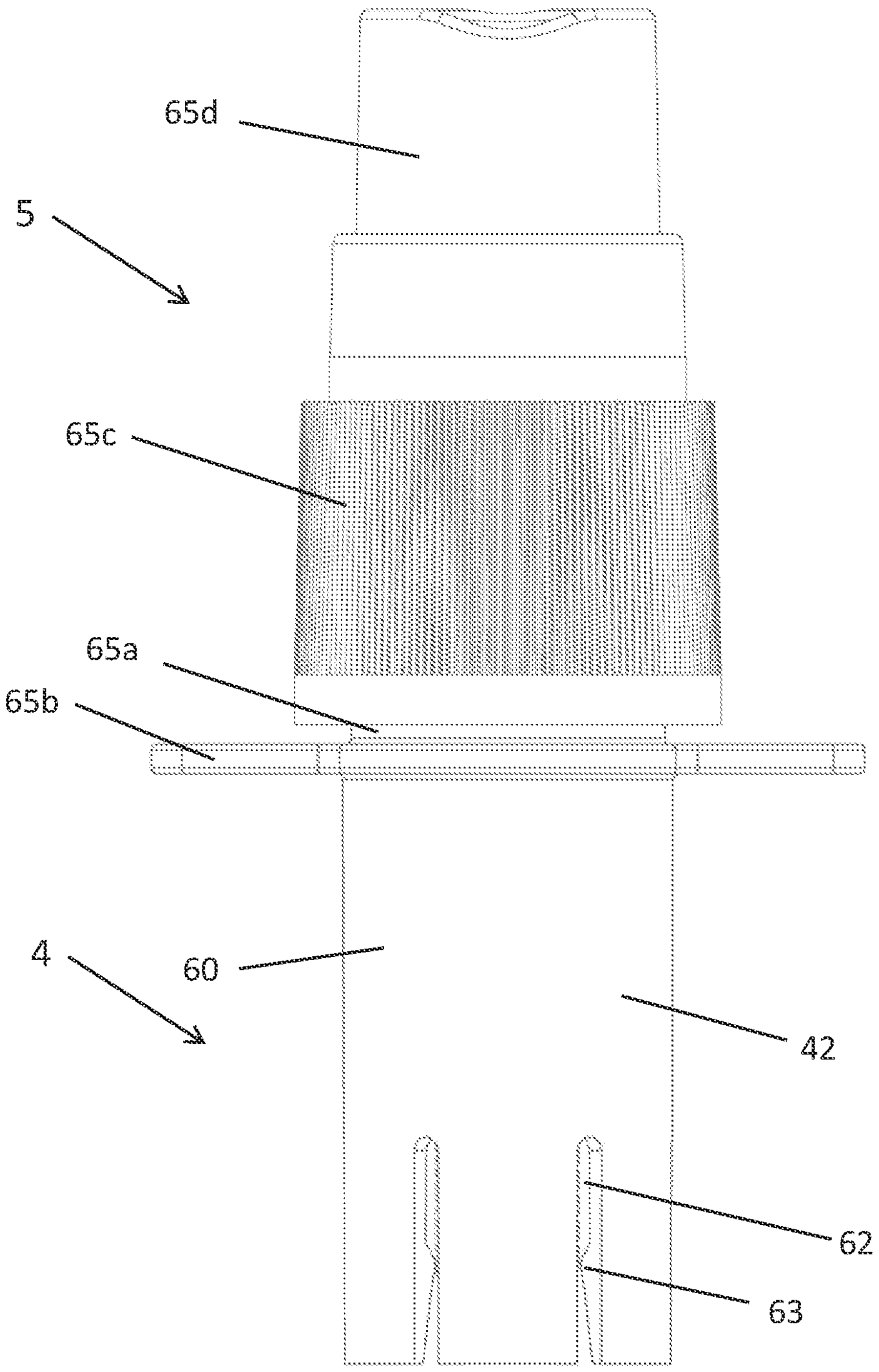
Figure 3A:
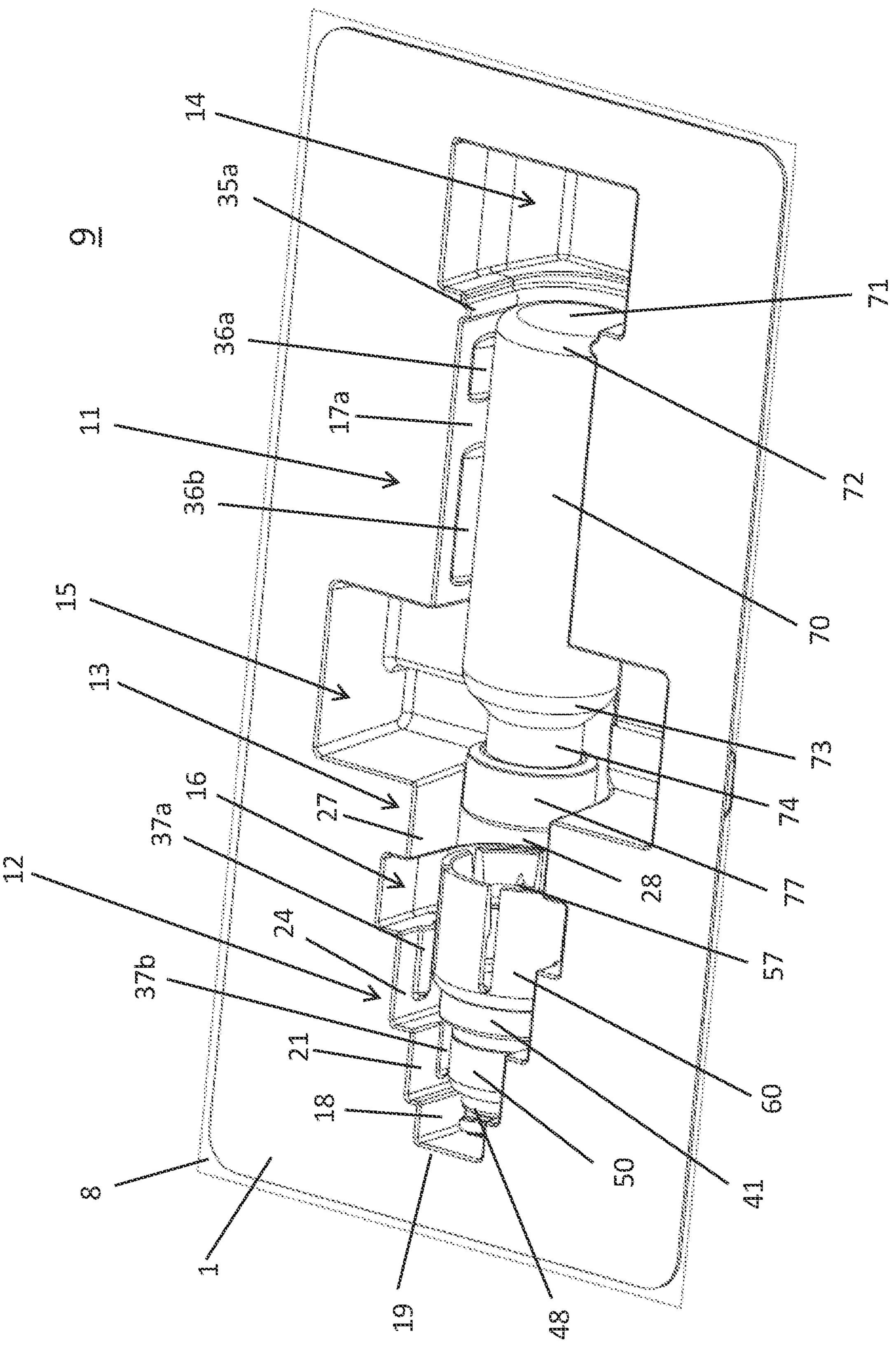
Figure 3B:
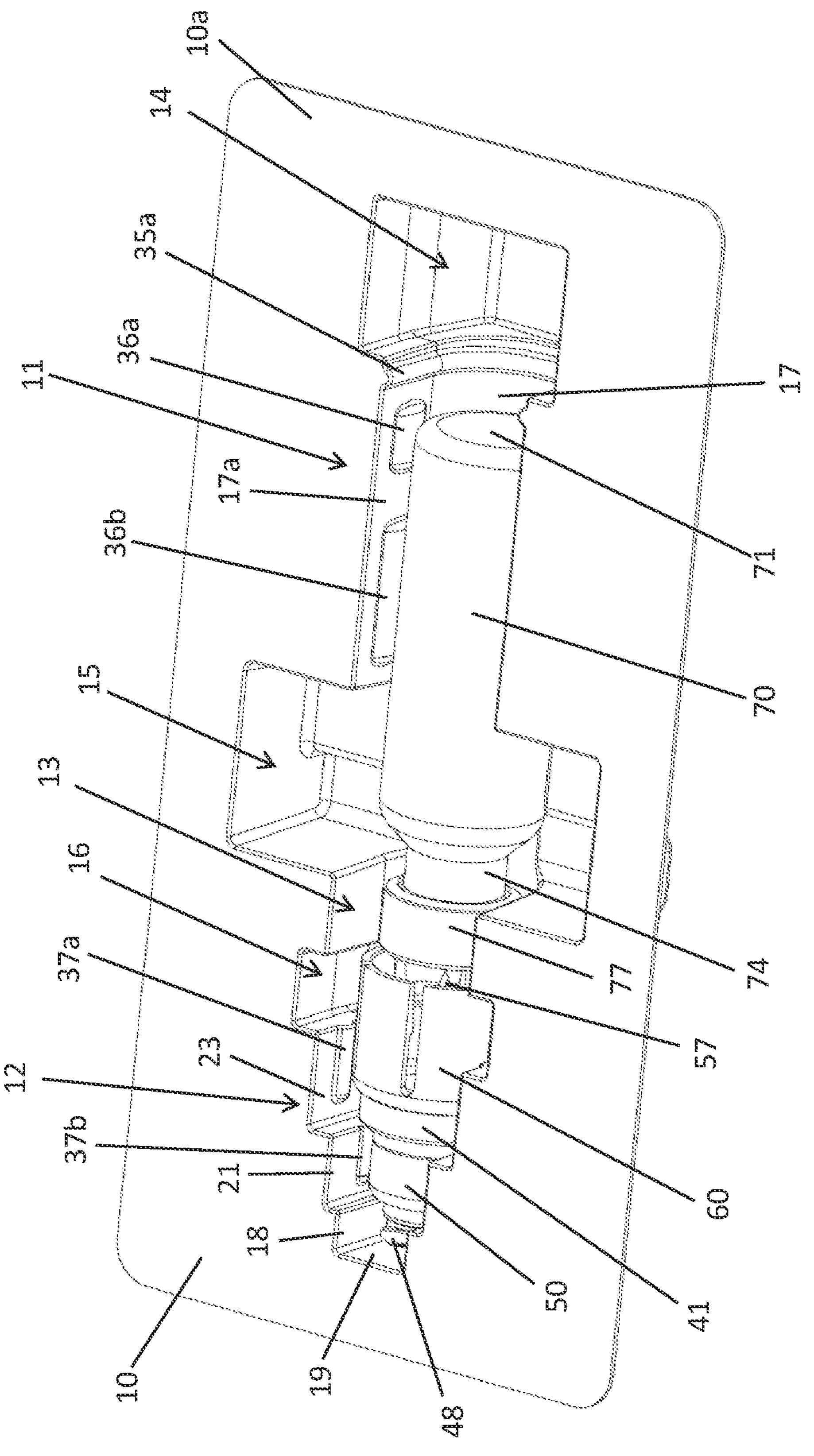
Figure 3C:
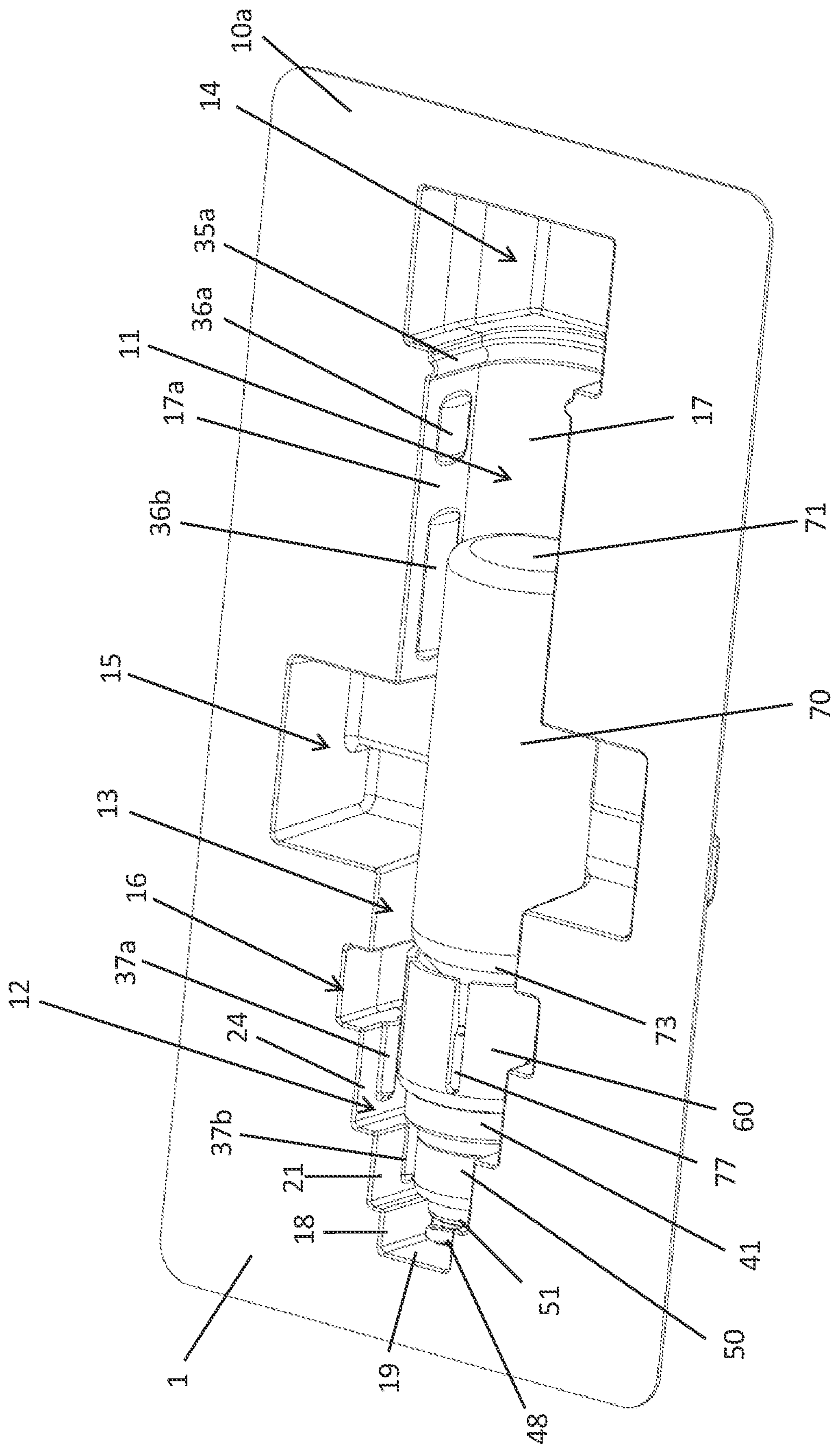
Figure 3D:
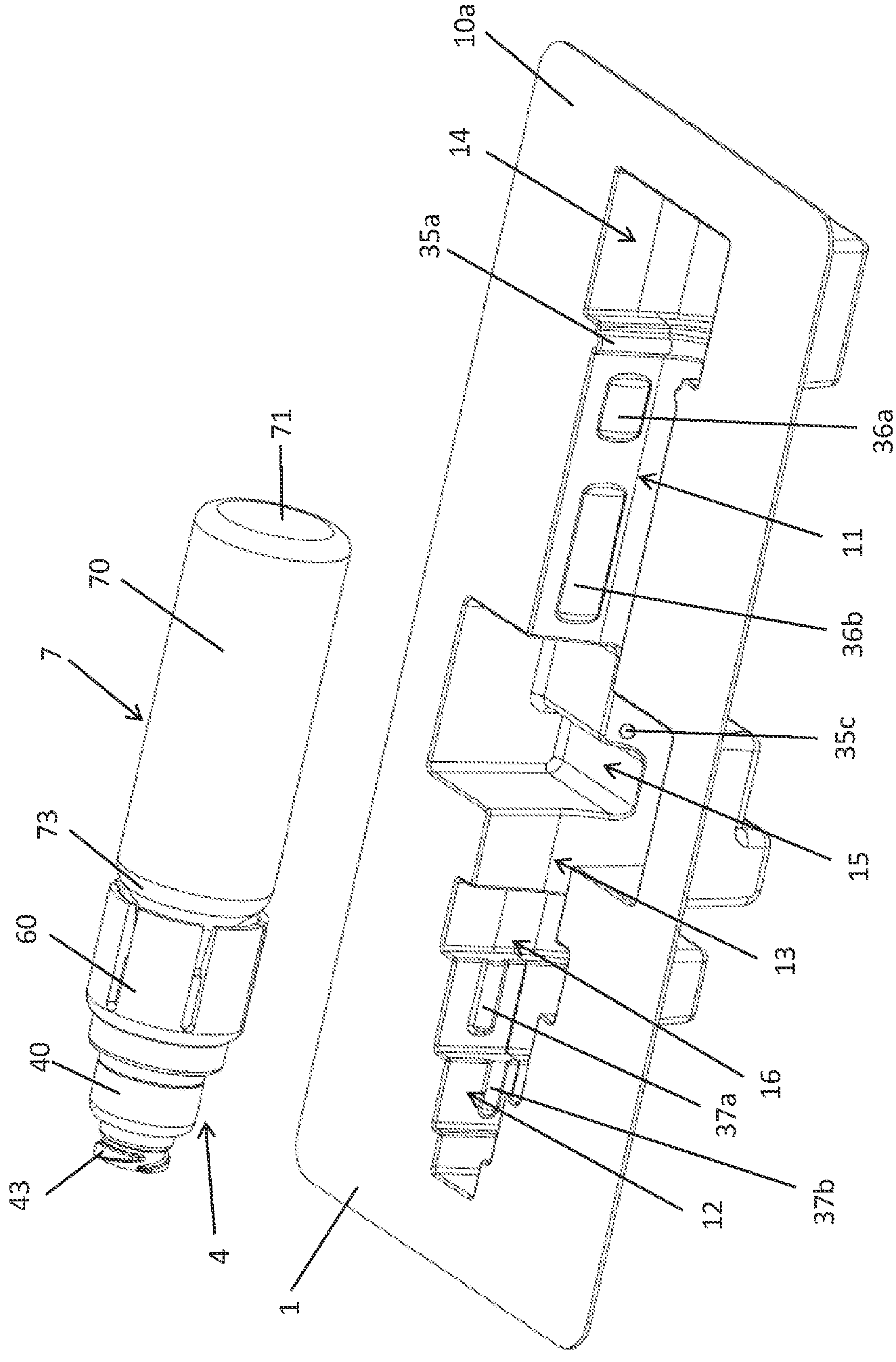
Figure 4A:
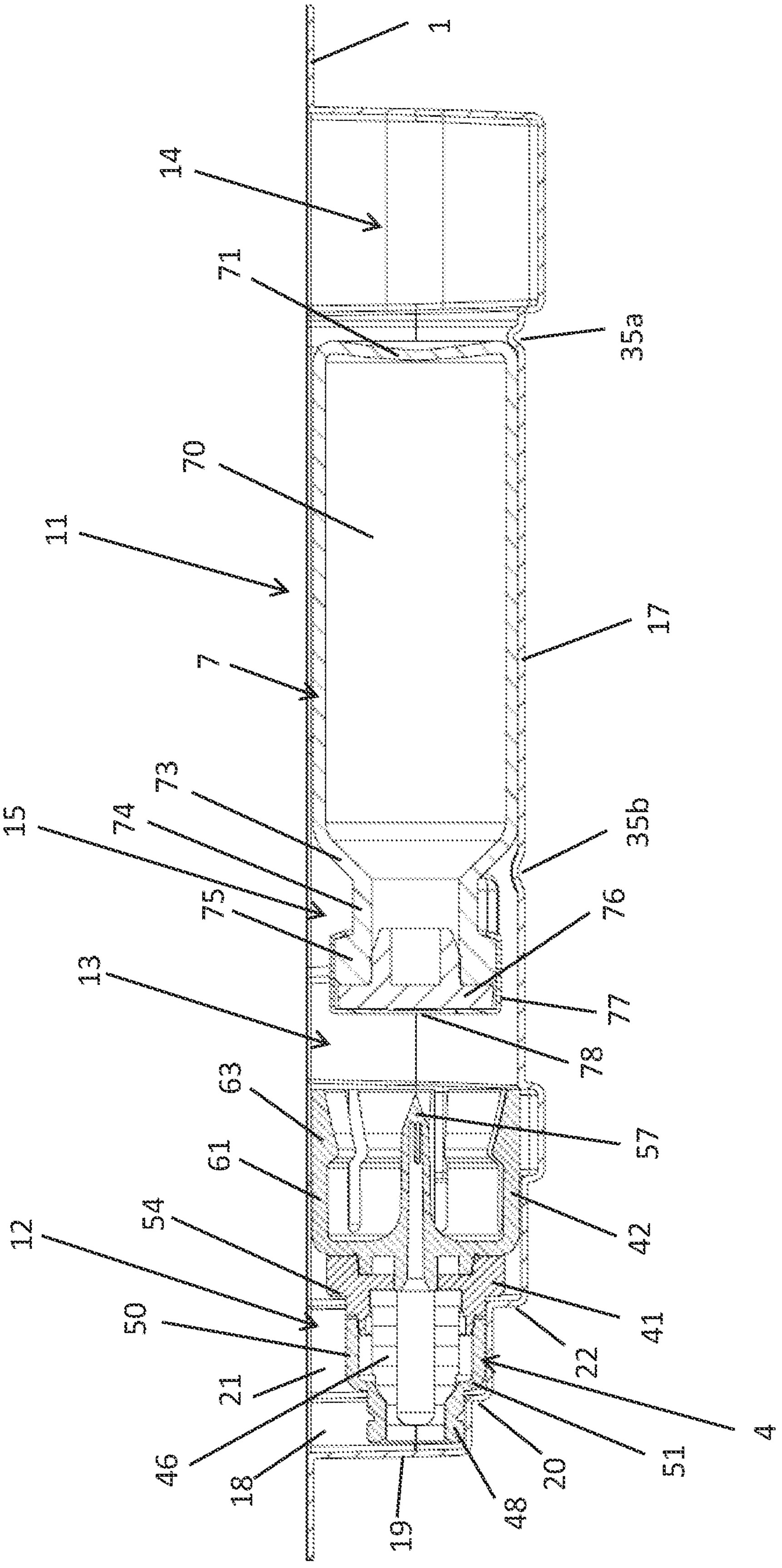
Figure 4B:
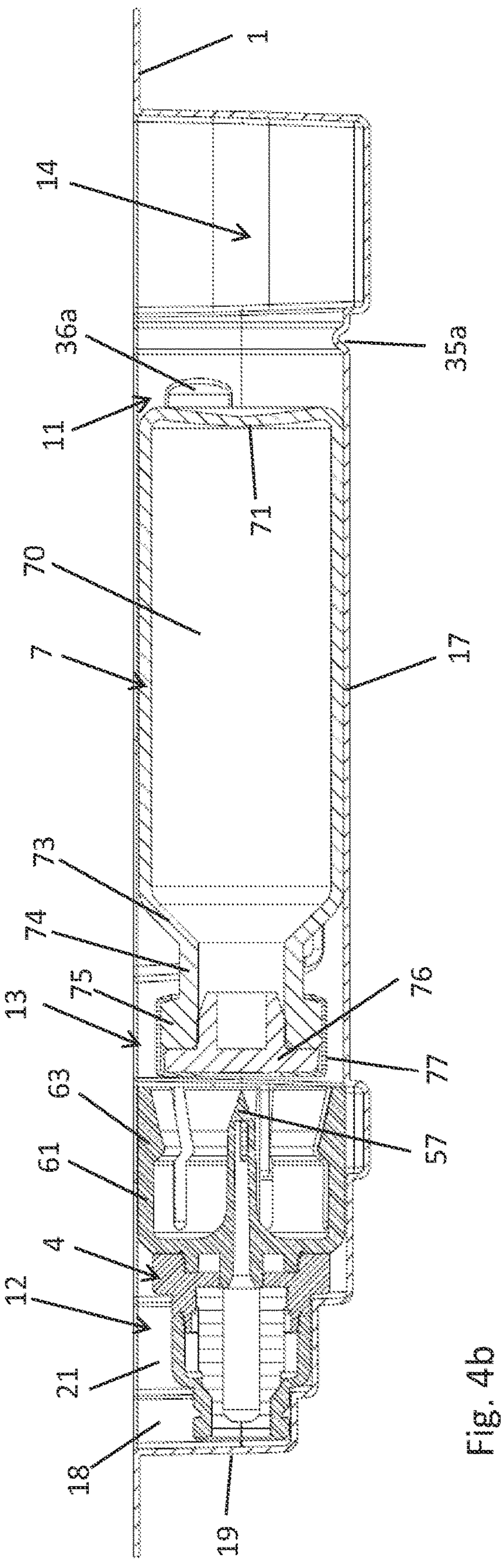

The invention will now be described by way of example and with reference to the accompanying drawings, from which further features, advantages and problems to be solved will be-come apparent. In the drawings:

FIGS. 1*a* and 1*b* show an example of a vial adapter for use in a tray according to the present invention in a schematic side-view and cross-section, respectively;

FIG. 1*c* shows another example of a vial adapter for use in a tray according to the present invention in a schematic side-view;

FIGS. 2*a* to 2*d* show a tray according to a first embodiment of the present invention in a perspective top view, in a perspective bottom view, in a plan view and in a side-view;

FIG. 3*a* shows a tray according to the present invention in a perspective top view, with a vial adapter accommodated in a vial adapter cavity of the tray and a vial accommodated in a vial cavity of the tray in a storage position that both coincide with the intermediate position;

FIG. 3*b* shows the tray of FIG. 3*a* in a perspective top view, with the vial displaced in axial direction towards the vial adapter, shortly before the piercing mandrel of the vial adapter pierces the vial stopper;

FIG. 3*c* shows the tray of FIG. 3*a* in a perspective top view, with the vial displaced from the position of FIG. 3*b* further in axial direction towards a transfer position, in which the piercing mandrel of the vial adapter pierces the vial stopper for liquid transfer;

FIG. 3*d* shows the tray of FIG. 3*a* in a perspective top view, with the assembly consisting of the vial and vial adapter locked to each other in the transfer position and removed from the cavities of the tray;

FIG. 4*a* shows in a schematic cross-section a tray according to the present invention together with a vial adapter and vial accommodated in cavities of the tray in the storage position of FIG. 3*a*, which coincides with an intermediate position;

FIG. 4*b* shows in a schematic cross-section the tray of FIG. 4*a* together with the vial adapter and vial accommodated in cavities of the tray in the position of FIG. 3*b;*

Figure 4C:
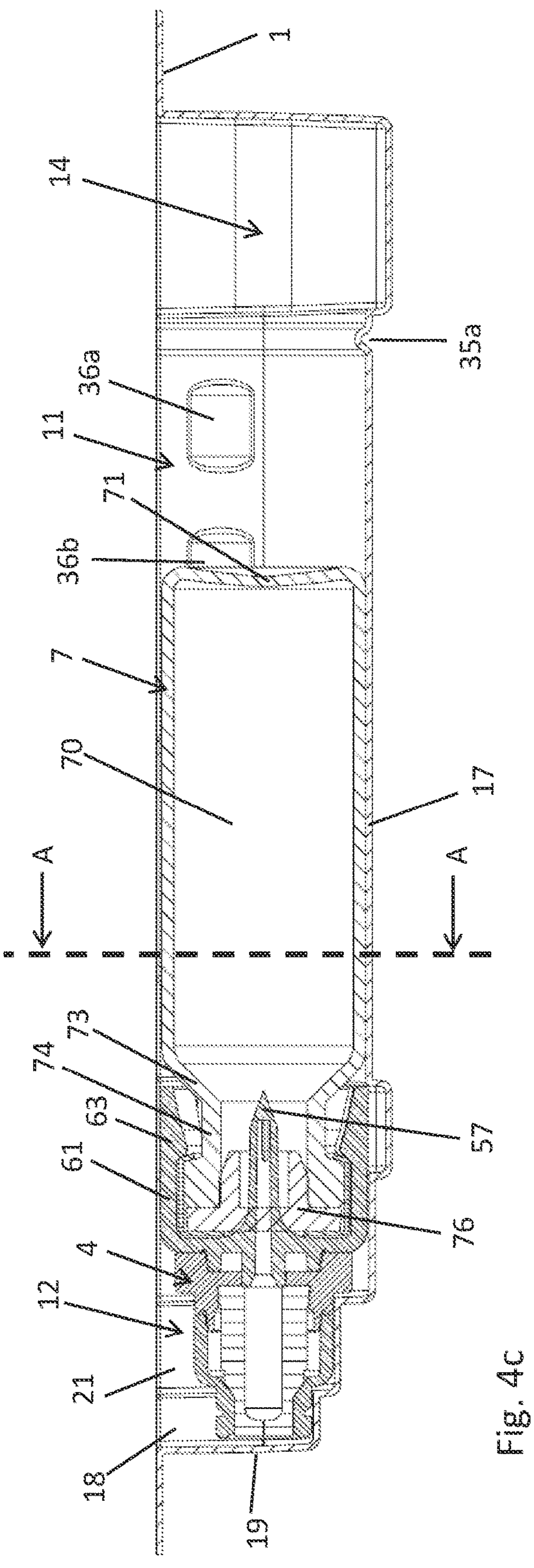

FIG. 4*c* shows in a schematic cross-section the tray of FIG. 4*a* together with the vial adapter and vial accommodated in cavities of the tray in the transfer position of FIG. 3*c;*

Figure 5B:
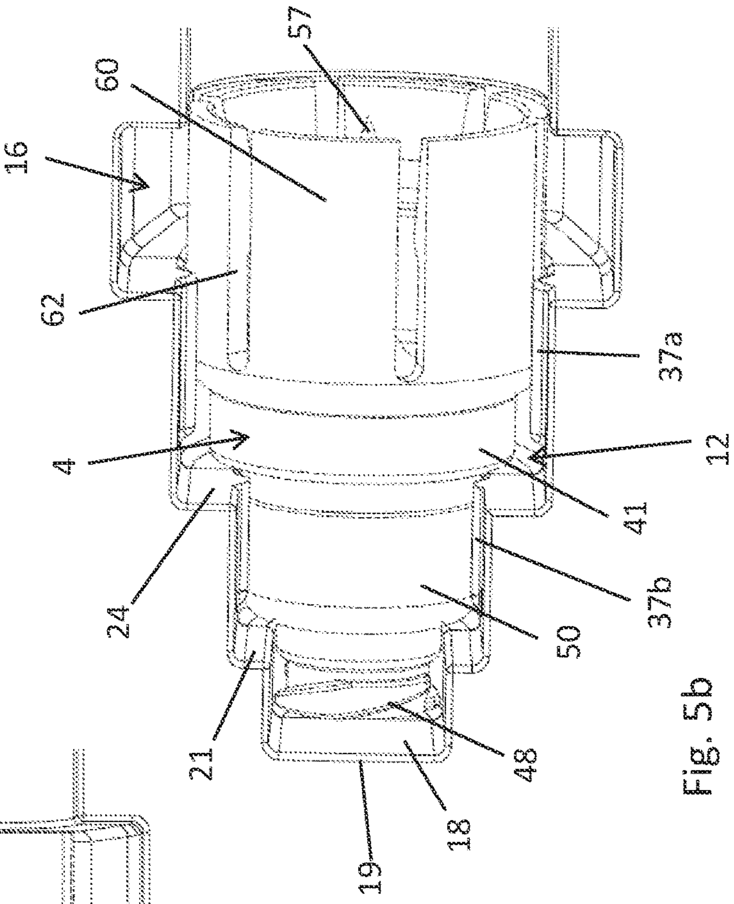
Figure 5A:
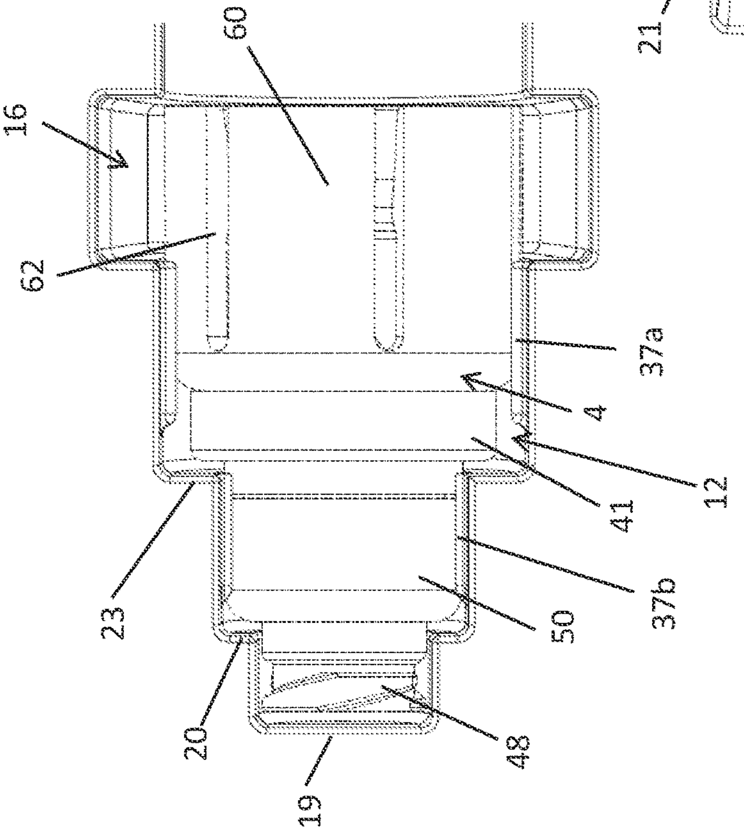
Figure 5C:
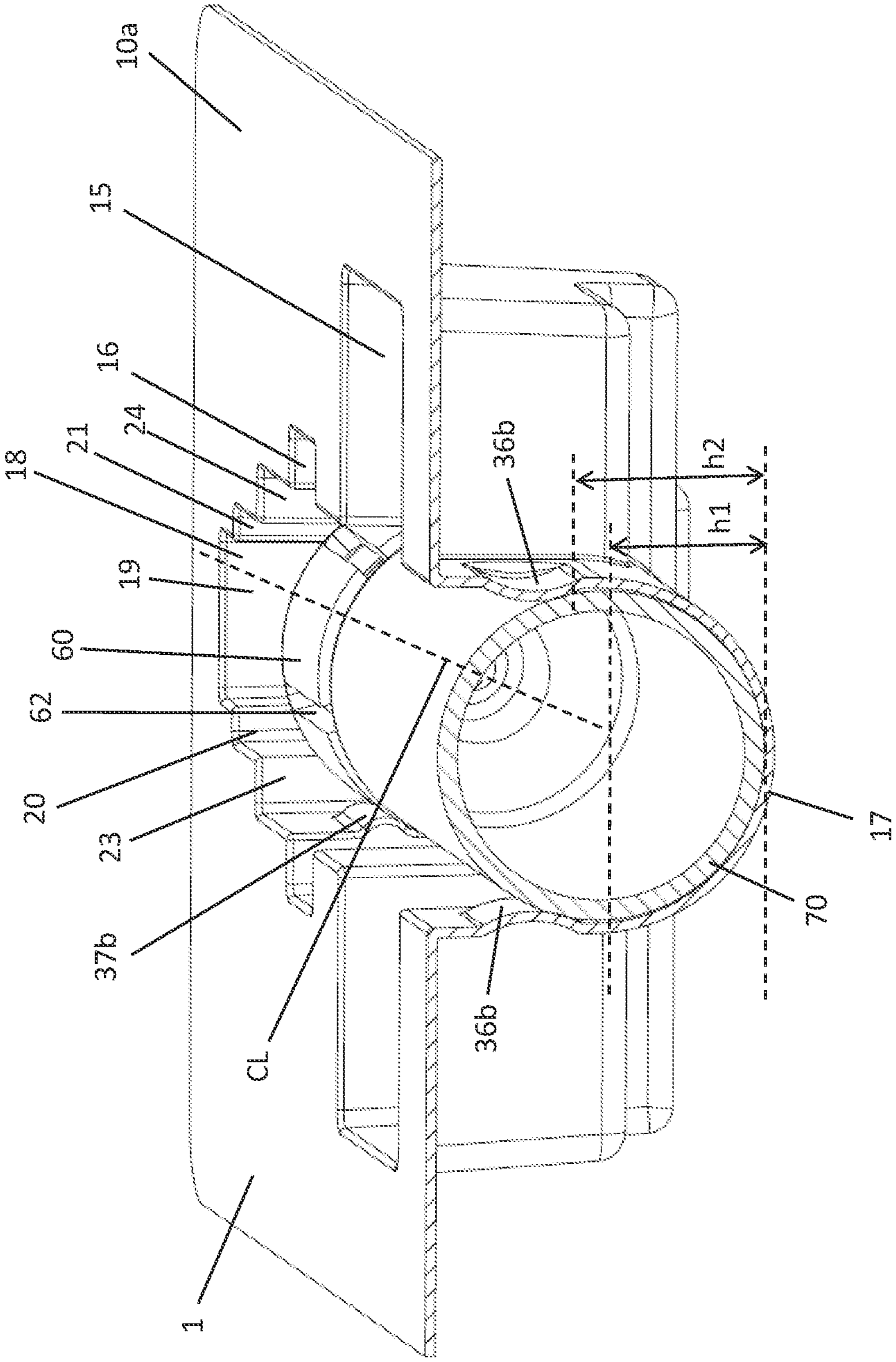

FIG. 5*a* shows in an enlarged plan view the vial adapter of FIG. 1*a* accommodated in a vial adapter cavity of a tray according to the present invention;

FIG. 5*b* is a perspective top view of the vial adapter of FIG. 1*a* accommodated in a vial adapter cavity of a tray according to the present invention;

FIG. 5*c* shows a schematic cross-section of the tray along A-A of FIG. 4*c;*

Figure 5D:
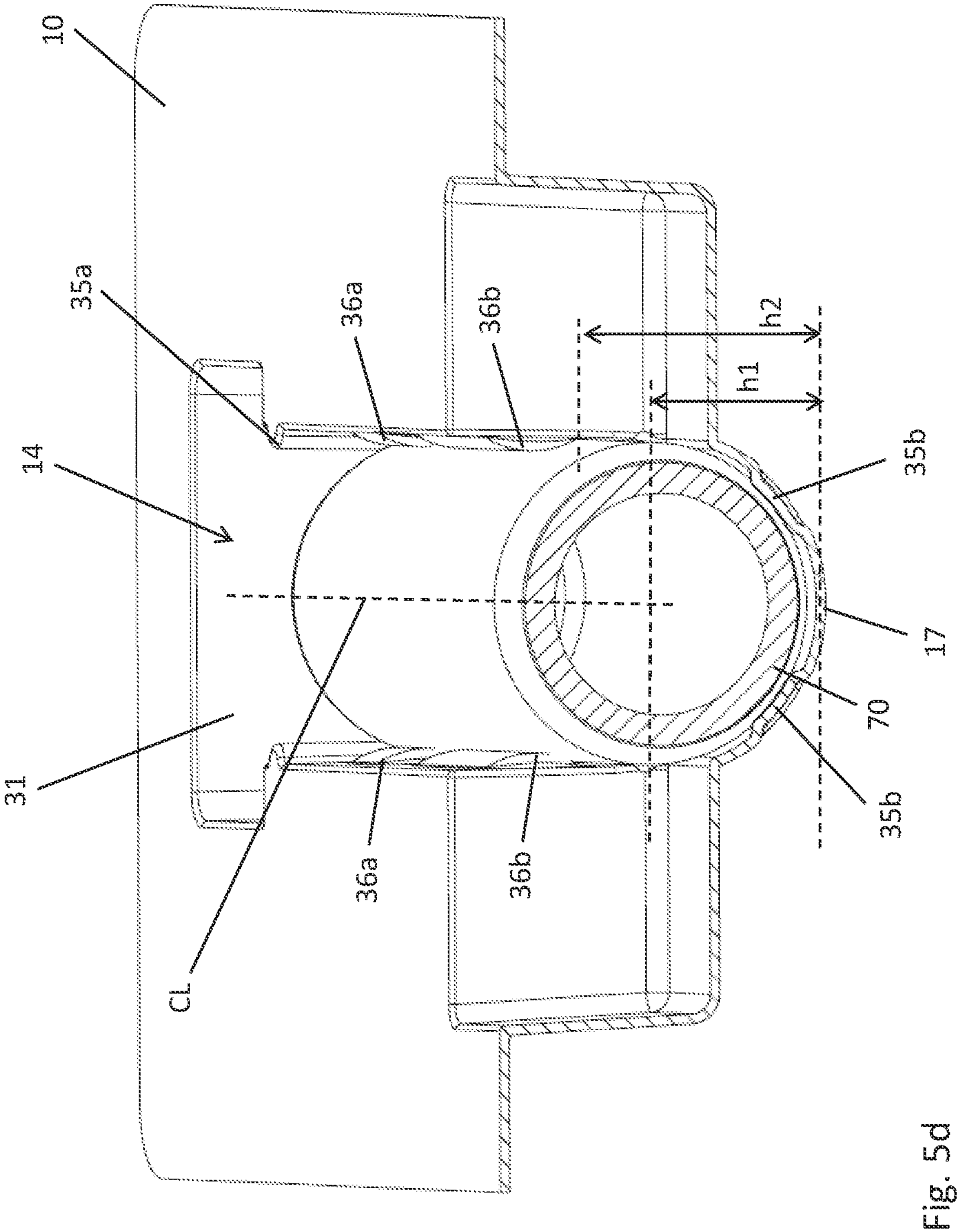

FIG. 5*d* shows a schematic cross-section of the tray along A-A of FIG. 4*c*, but viewed in the opposite direction of FIG. 5*c;*

Figure 5E:
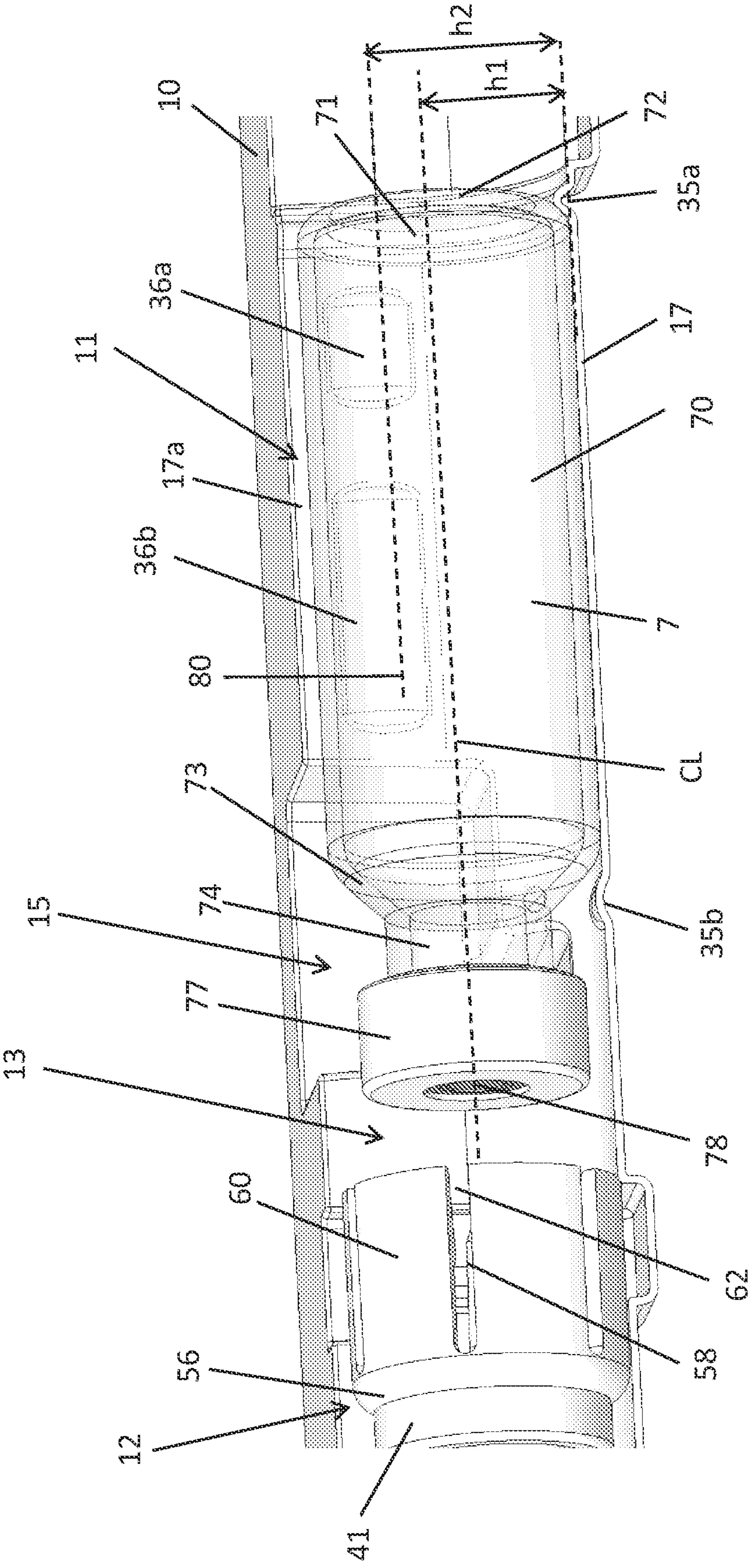

FIG. 5*e* is a schematic partial side-view showing a vial and vial adapter accommodated in the cavities of a tray according to the present invention in the intermediate position of FIG. 3*a;*

Figure 6A:
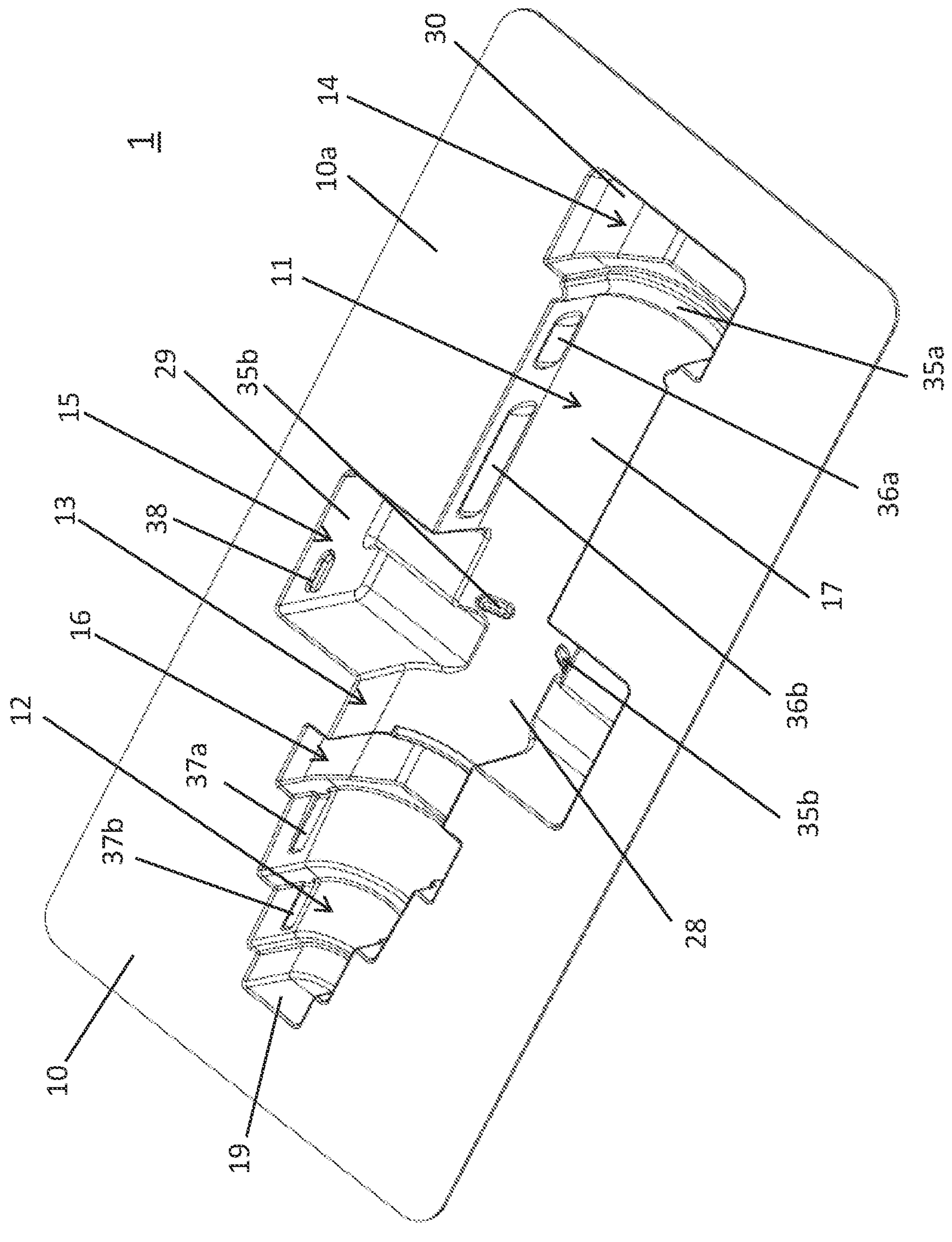
Figure 6B:
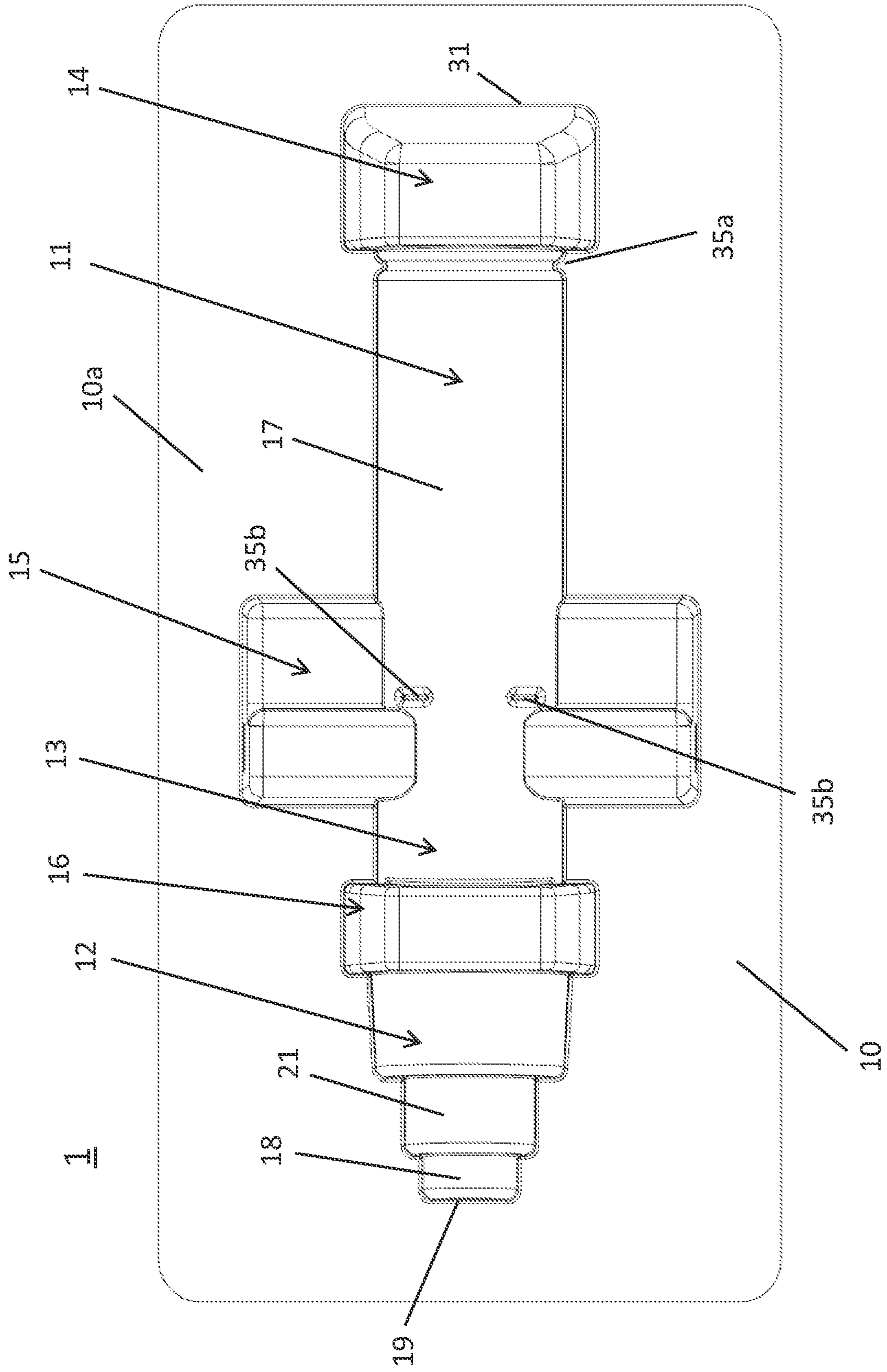
Figure 6C:
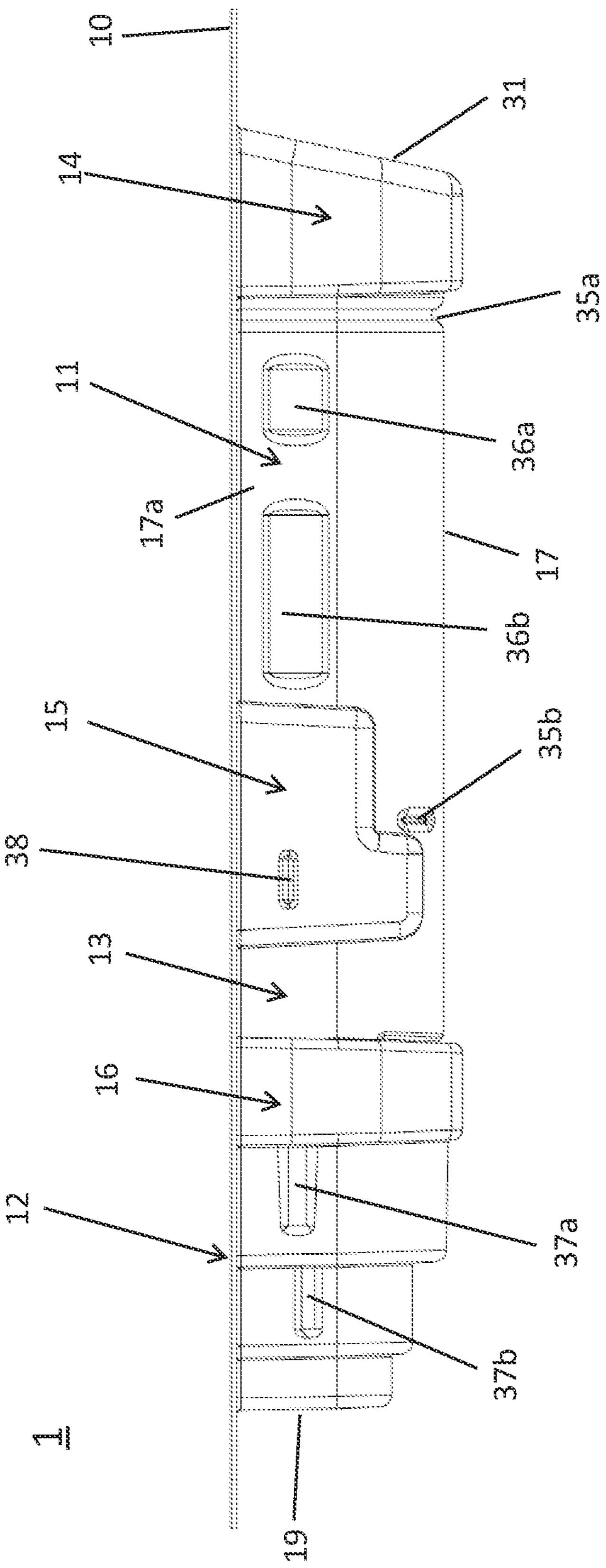
Figure 7A:
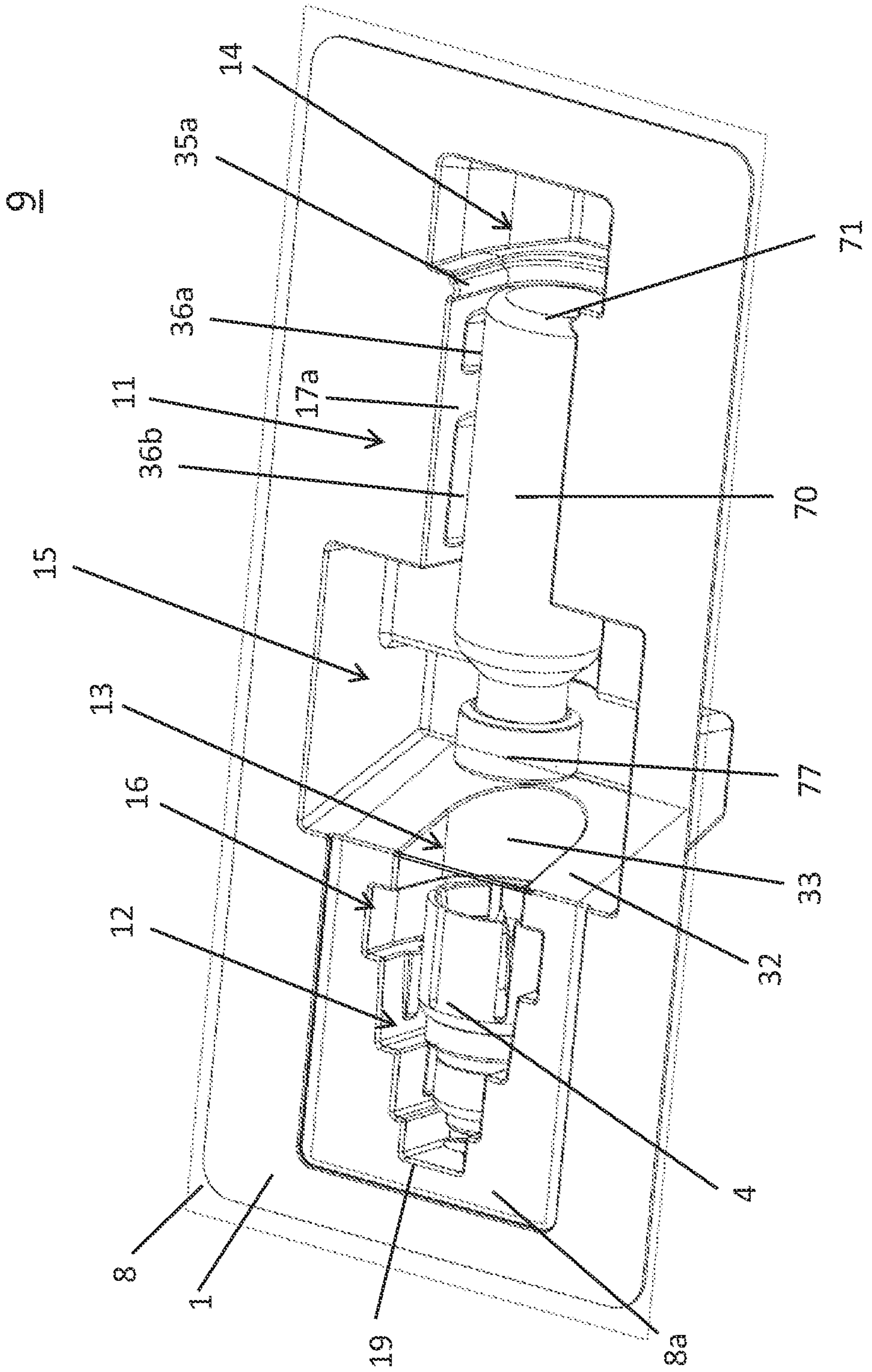
Figure 7B:
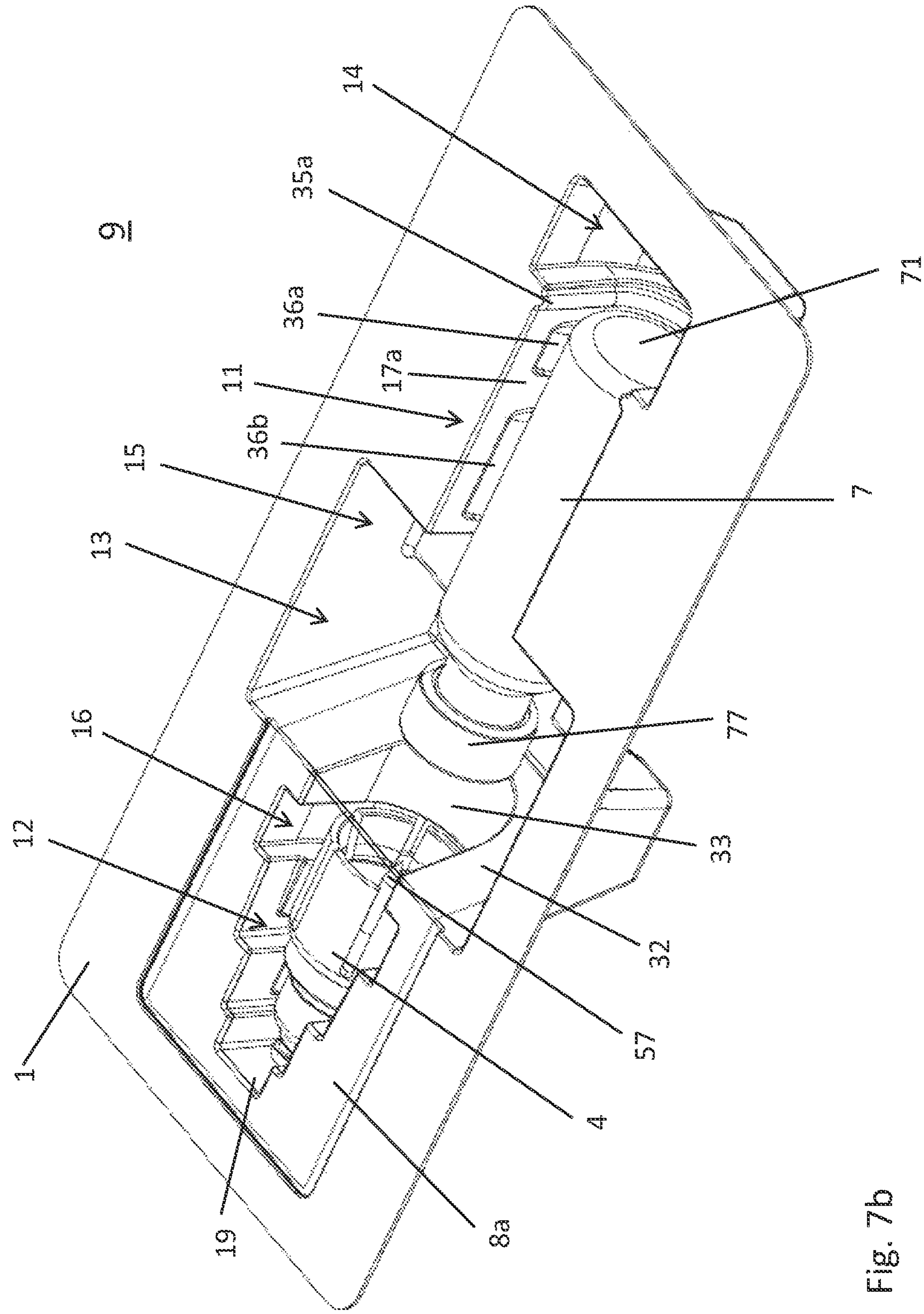
Figure 7C:
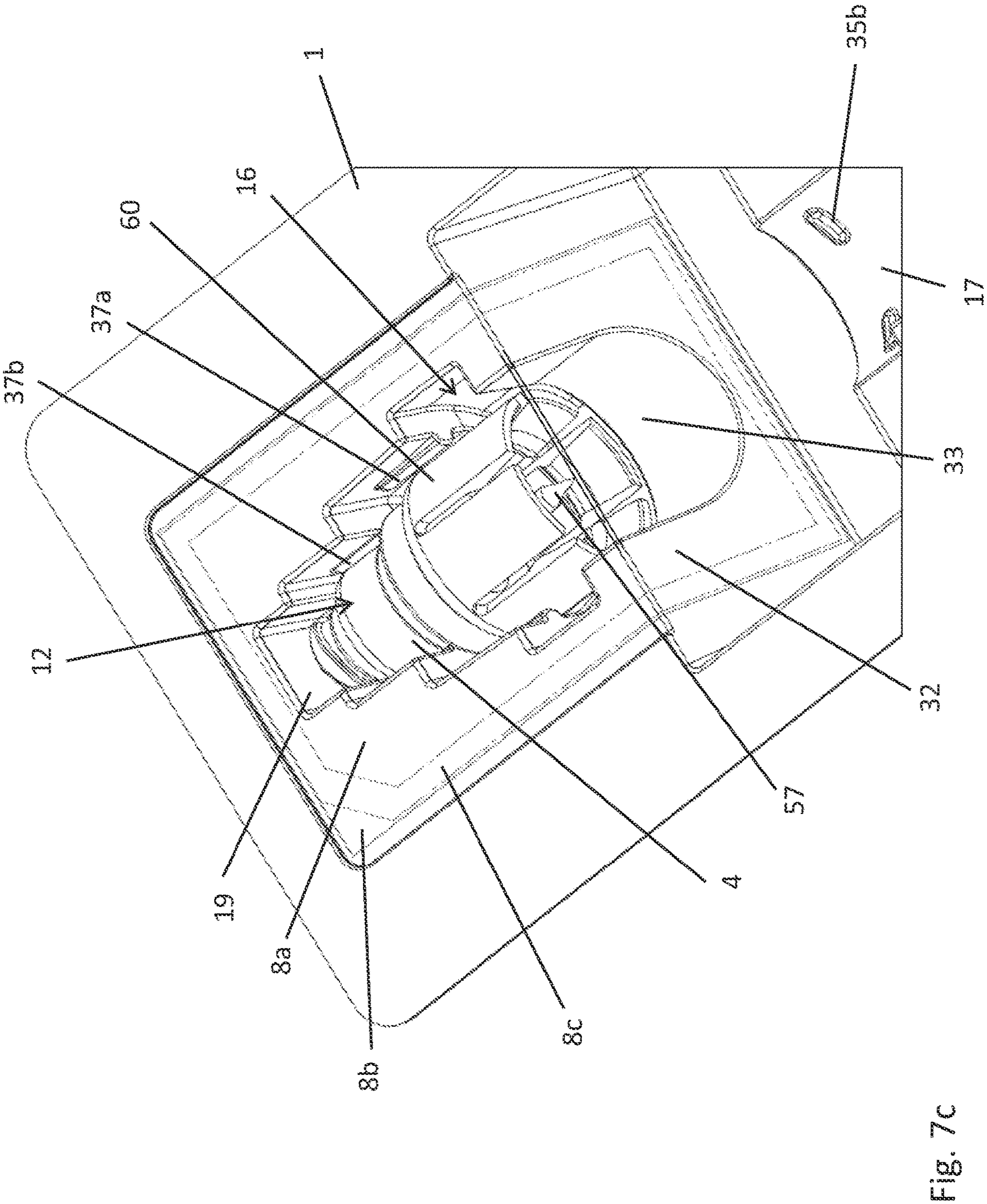
Figure 7D:
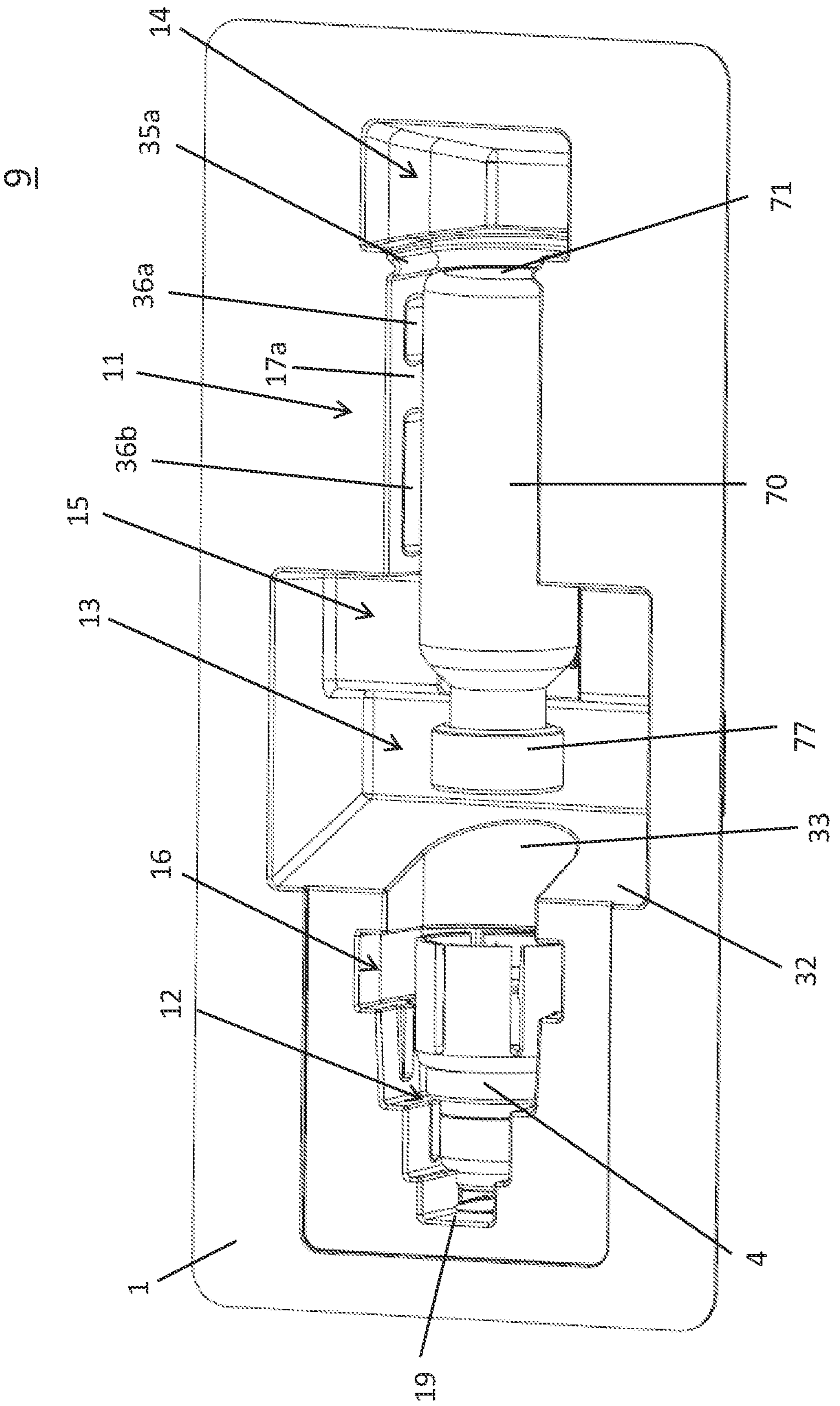
Figure 8A:
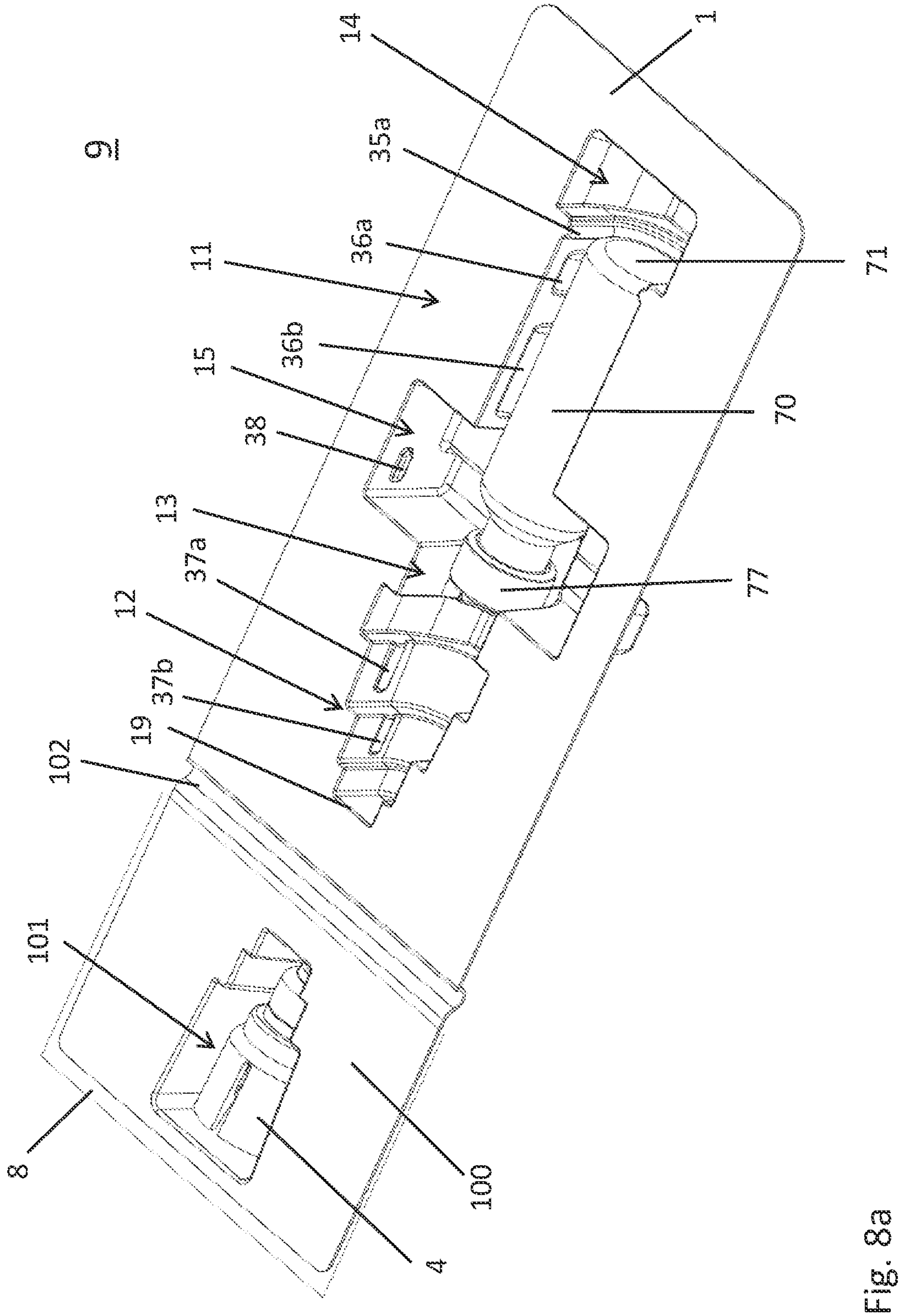
Figure 8B:
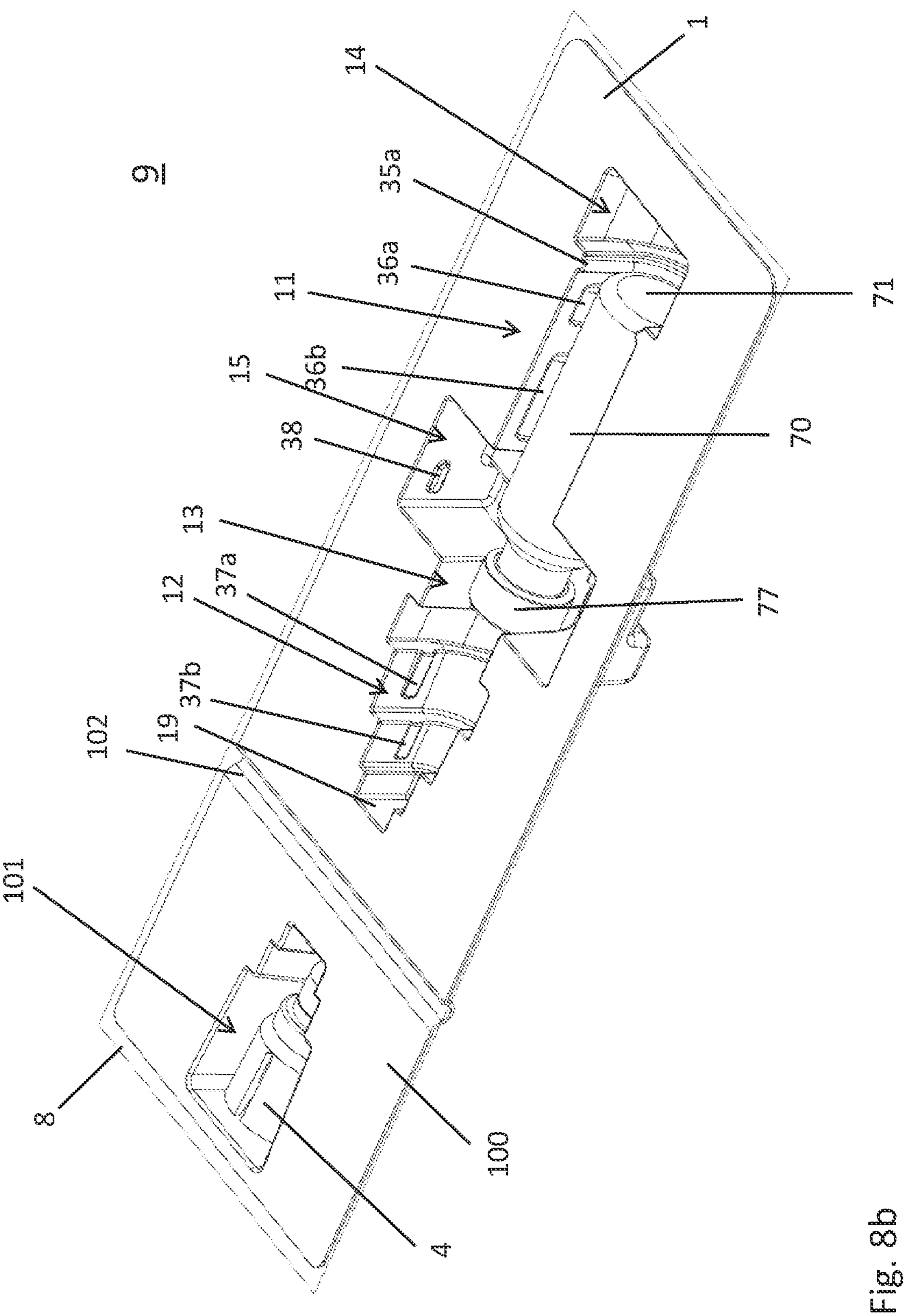
Figure 8C:
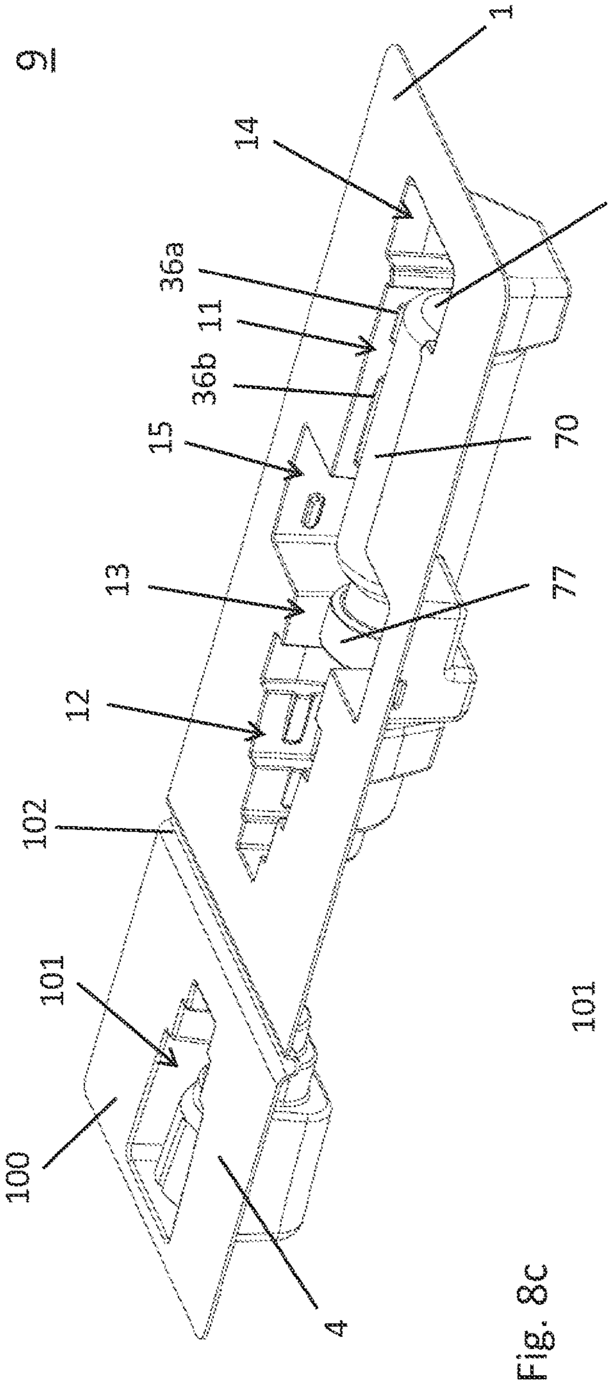
Figure 8D:
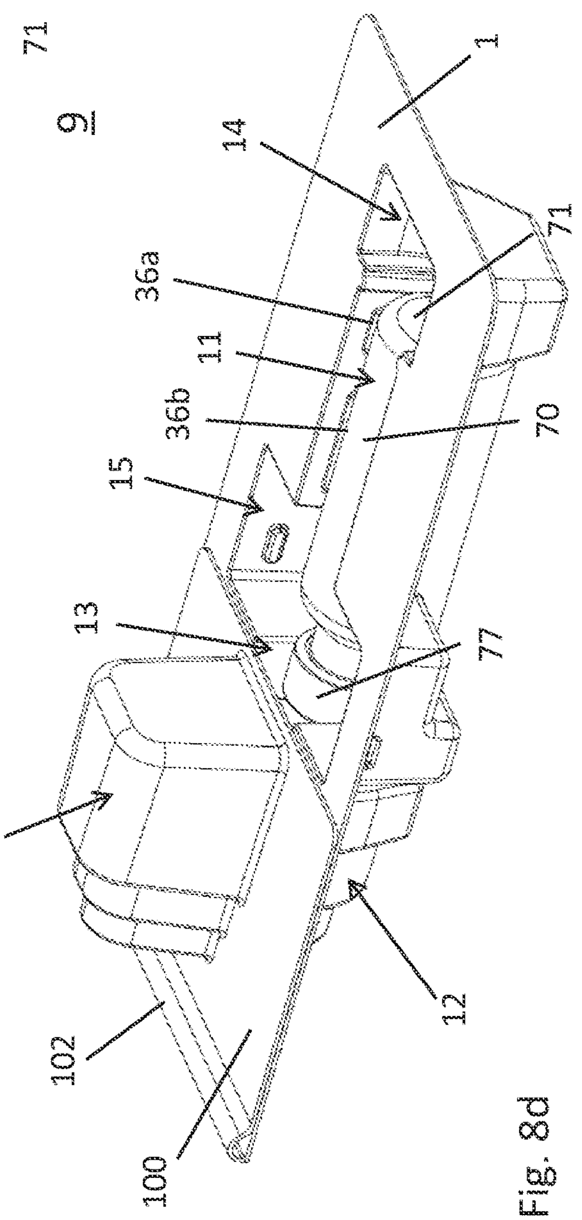
Figure 8E:
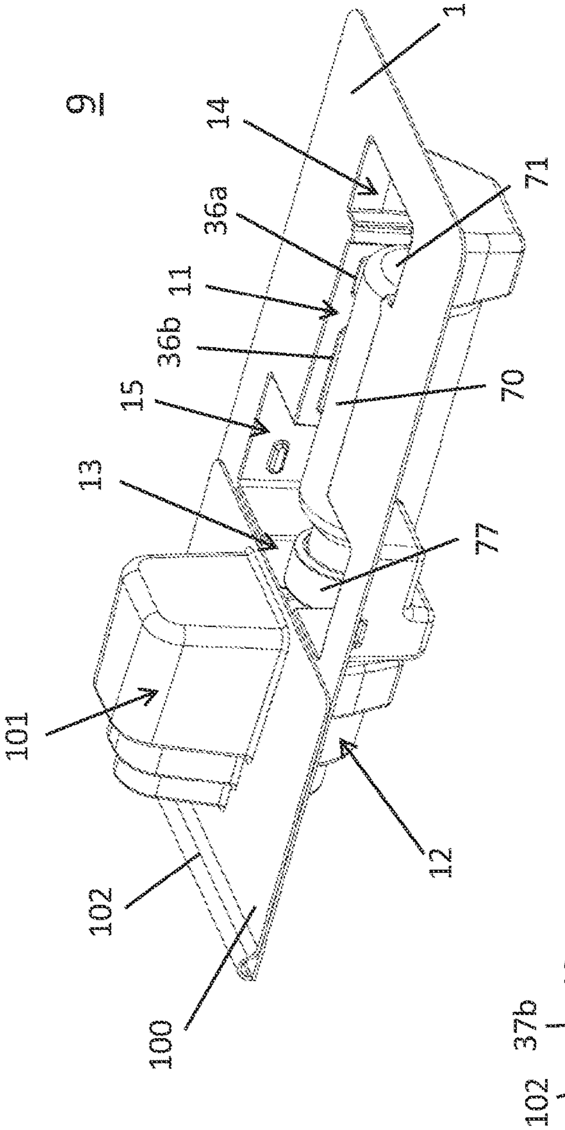
Figure 8F:
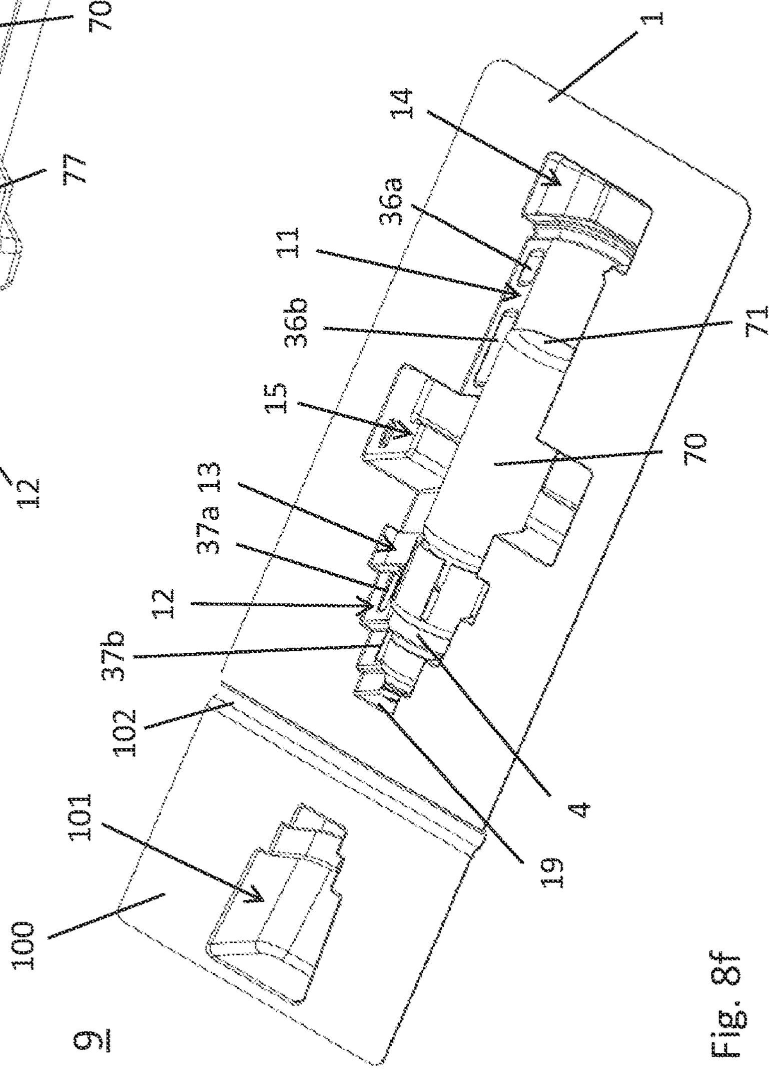
Figure 9:
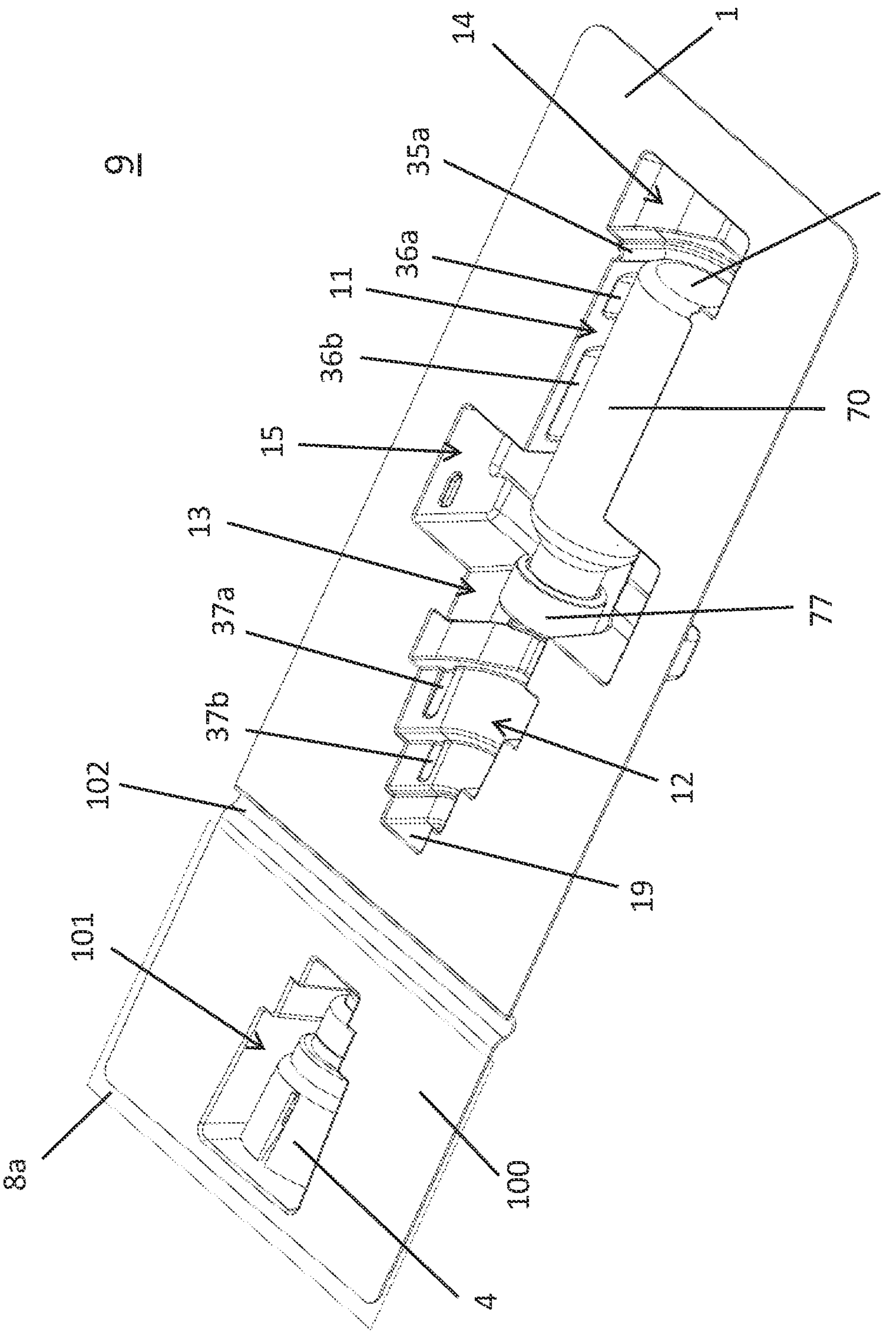

FIGS. 6*a*-6*c* show a tray according to a second embodiment of the present invention in a perspective top view, in a bottom view, and in a side-view;

FIG. 7*a* shows a sterile packaging unit with a tray according to a third embodiment of the present invention in a position used for long-time storage of the vial and vial adapter;

FIG. 7*b* shows the packaging unit of FIG. 7*a* after removal of a first packaging foil;

FIG. 7*c* shows the vial adapter cavity of the tray of FIG. 7*a*, which is sterile sealed by a second packaging foil;

FIG. 7*d* shows the packaging unit of FIG. 7*a* after removal of the first and second packaging foil with the vial adapter and the vial positioned in the intermediate position;

FIG. 8*a* shows a sterile packaging unit with a tray according to a fourth embodiment of the present invention in a position used for long-time storage of the vial and vial adapter;

FIG. 8*b* shows the packaging unit of FIG. 8*a* after removal of a first packaging foil;

FIG. 8*c* shows the packaging unit of FIG. 8*a* after removal of a second packaging foil;

FIG. 8*d* shows the packaging unit of FIG. 8*a* in a position, in which the vial adapter storage cavity is positioned vertical above the vial adapter cavity and before the transfer of the vial adapter from the vial adapter storage cavity into the vial adapter cavity;

FIG. 8*e* shows the packaging unit of FIG. 8*a* in a position, in which the vial adapter storage cavity is positioned vertical above the vial adapter cavity and after the transfer of the vial adapter from the vial adapter storage cavity into the vial adapter cavity, with the vial adapter positioned in the intermediate position;

FIG. 8*f* shows the packaging unit of FIG. 8*a* in a position enabling the displacement of the vial towards the vial adapter from the intermediate position to the transfer position;

FIG. 9 shows a modification of the packaging unit of FIG. 8*a;*

Figure 10A:
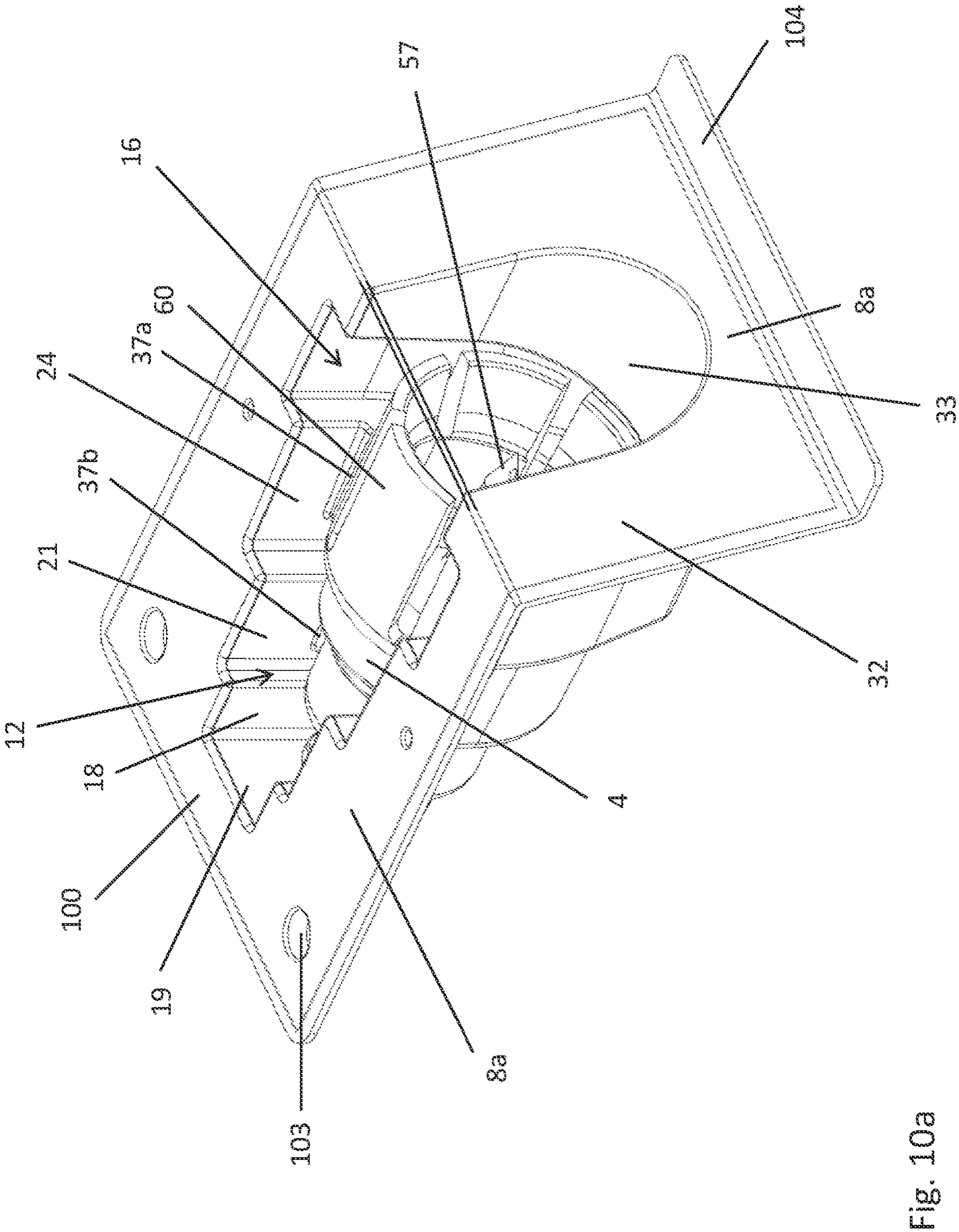
Figure 10B:
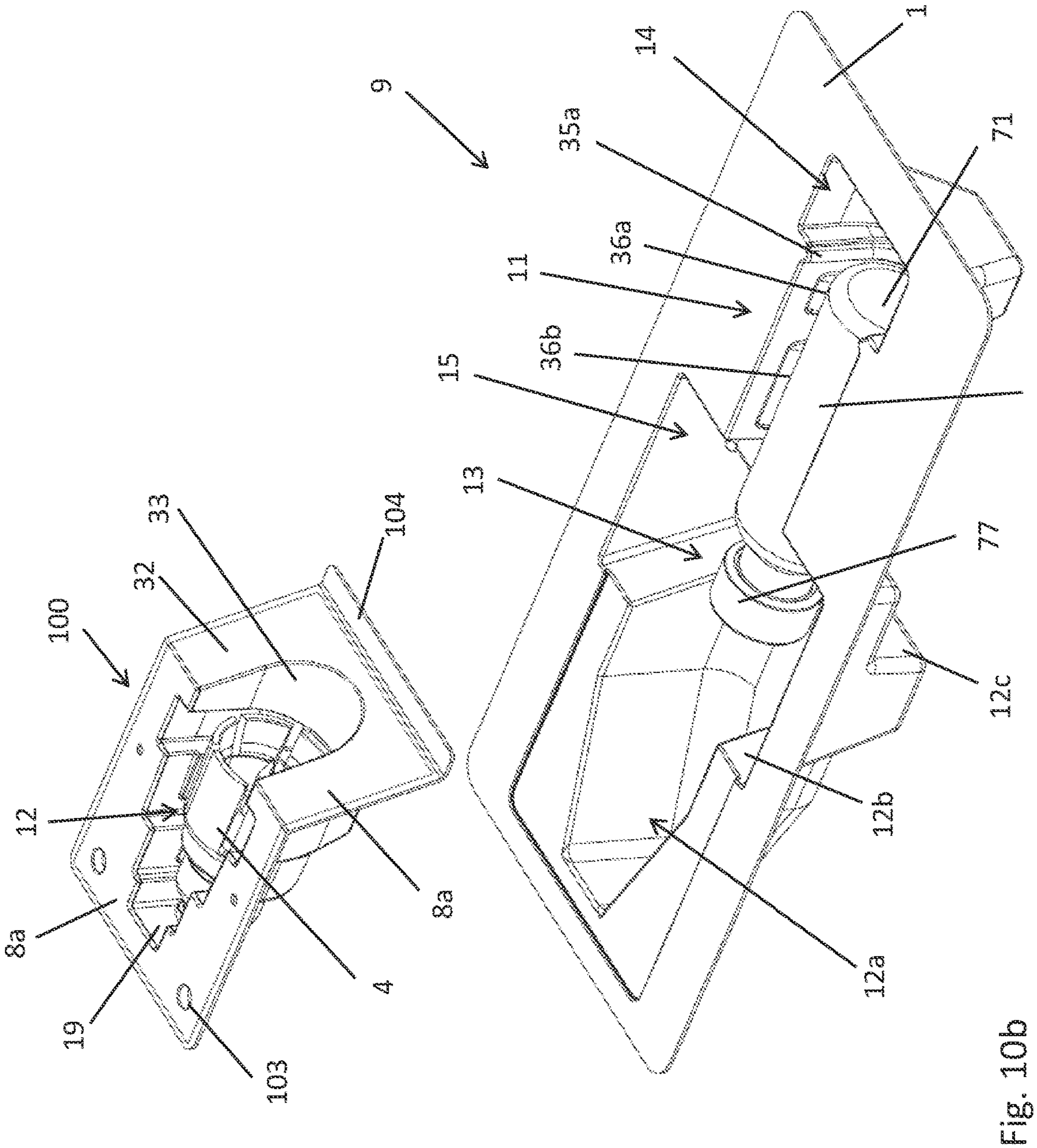

FIG. 10*a* shows a tray member insert including a vial adapter storage cavity for long-time storage of a vial adapter under sterile conditions; and FIG. 10*b* is a perspective exploded top view of a packaging unit including a tray according to a fifth embodiment of the present invention and including the tray member insert of FIG. 10*a*.

In the drawings, the same reference numerals designate identical or substantially equivalent elements or groups of elements.

DETAILED DESCRIPTION OF PREFERRED EMBODIMENTS

FIGS. 1*a* and 1*b* show an example of a vial adapter for use in a tray according to the present invention in a schematic side-view and cross-section, respectively. The vial adapter 4 has a generally stepped outer contour consisting of a first cylindrical portion 48, a second cylindrical portion 50 and a third cylindrical portion, which is formed as a skirt 60 as outlined below in more detail. A first step 51 is formed between the two cylindrical portions 48 and 50 and a second step 54 is formed between the second cylindrical portion 50 and the skirt 60. The outer diameters of the first and second cylindrical portions 48, 50 and the skirt 60 are different and increase from the front end 44 to the bottom end 64.

The vial adapter 4 consists basically of a valve body 40 and a coupling body 42. The valve body 40 includes a valve of the type disclosed in U.S. Pat. No. 6,651,956 B2, the whole content of which is hereby incorporated by reference. The valve stem 46 is accommodated in the cavities of the first and second cylindrical portion 48, 50 and abuts against the conical portion 49 and the bottom of cavity formed by the cylindrical wall 53 of the connecting ring 41, which connects the valve body 40 to the skirt 60, e.g. by bonding or ultrasonic welding. A slit is formed in the front end of the elastomeric valve member 45, which is exposed in the front opening 44 of the first cylindrical portion 48. An outer thread 43 on the first cylindrical portion 48 enables the coupling with a Luer thread of a syringe. When a syringe is coupled to the first cylindrical portion 48 by threading, the tip of the syringe will penetrate the slit and enter the central channel 47 of the valve member 45 for liquid transfer.

The coupling body 42 of the vial adapter 4 is configured to be locked to the front end of a vial in a transfer position, such as of the general configuration disclosed e.g. in U.S. Pat. No. 8,752,598 B2. The coupling body 42 includes a skirt 60 consisting of a plurality of curved segments that are disposed along the circumference of the skirt 60 at equiangular intervals and interrupted by axial slots 62. The segments form resilient legs 61 that can be flexed radially outwards. On the inner surfaces of the resilient legs 61 locking protrusions 63 are formed. The coupling body 42 includes a top wall 55 with a central piercing mandrel 57 that comprises a central cannula or lumen 58 that is in fluid communication with the central channel 47 of the valve member 45 via the mouth 58*a*.

When the vial adapter 4 is pushed onto the front end of a vial of the kind shown in FIG. 4*a*, the bottom bevels of the protrusions 63 will finally slide along the outer edge of the metal cap 77 crimped onto the front end of the vial and thus start spreading the resilient legs 61 apart. When the vial adapter 4 is pushed further onto the front end of a vial, the resilient legs will continue to be spread apart and finally the piercing mandrel 57 will start piercing or puncturing the elastomeric stopper 76 sealing the opening at the front end of the vial. When the vial adapter 4 is pushed further onto the front end of a vial, finally the protrusions 63 will grip behind the bottom edge of the metal cap 77 of the vial and the piercing mandrel 57 will have fully penetrated or punctured the vial stopper 76, thus enabling a liquid transfer into and/or out of the vial in the transfer position shown in FIG. 4*c*.

The general shape of a vial to be accommodated in a tray according to the present invention is shown in the cross-sectional view of FIG. 4*a*. The vial 7 has a cylindrical vial body 70 with a closed bottom 71 and a conical shoulder 73 that is followed by a narrow neck 74 and a wider rolled edge 75 that defines a filling opening of the vial 7. This filling opening is sealed by an elastomeric stopper 76 that is held in place by a cylindrical metal cap 77 that is crimped over the rolled edge 75. A circular central opening 78 is defined in the upper surface of the metal cap 77 and exposes a central portion of the stopper 76 that will be pierced or punctured by the piercing mandrel 57 of the vial adapter 4 in the transfer position shown in FIG. 4*c*, when a vial adapter 4 is locked on the front end of the vial 7. The cylindrical shape of such a vial 7 precisely defines a center line.

Figure 2A:
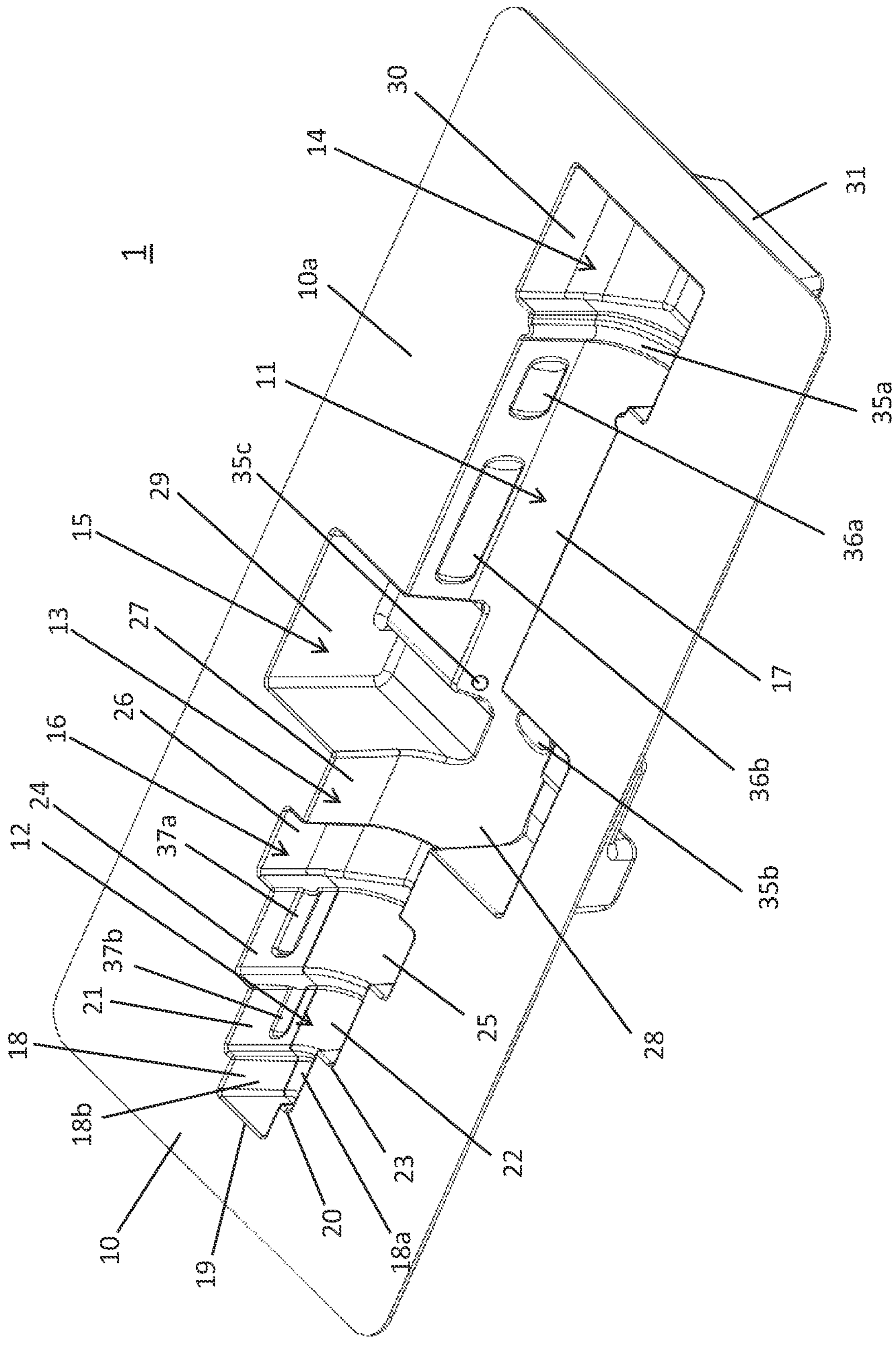

For storing a vial adapter 4 in a fixed positional relationship relative to such a vial that enables the establishment of the transfer position (when the vial adapter 4 is locked on the front end of a vial 7) by means of a relative movement of the vial adapter 4 and vial 7 only in axial direction, according to the present invention a tray 1 as shown in FIGS. 2*a* to 2*d* is used. The tray 1 comprises a tray member 10 comprising at least a vial cavity 11 for accommodating a vial (not shown) at least partially and a vial adapter cavity 12 for accommodating a vial adapter (not shown) at least partially. The tray member 10 preferably has a planar upper surface 10*a* so that a packaging or sealing foil, in particular a sterile packaging or sealing foil, may be bonded onto the upper surface 10*a*, for sealing, if this should be necessary, a vial and a vial adapter in the cavities of the tray member 10, preferably under sterile conditions. As shown in FIG. 2*a*, the tray member 10 may include additional cavities 13 to 15 enabling additional functions, as outlined below in more detail.

As shown in FIG. 2*a*, the vial adapter cavity 12 may have a stepped inner profile corresponding to the stepped outer contour of the vial adapter to be accommodated in the vial adapter cavity 12 to thereby keep the axial position of the vial adapter fixed. Assuming for this example that a vial adapter of the general shape shown in FIGS. 1*a* and 1*b* is to be accommodated in the vial adapter cavity 12, it may thus include a first relatively narrow cavity 18 for accommodating the first cylindrical protrusion 48 of the vial adapter 4, a second cavity 21, which is a little wider than the first cavity 18, for accommodating the second cylindrical protrusion 50 of the vial adapter 4, and a third cavity 24, which is a little wider than the second cavity 21, for accommodating the coupling body 40 of the vial adapter 4.

FIGS. 5*a* and 5*b* show how the vial adapter 4 of FIGS. 1*a* and 1*b* is accommodated in such a vial adapter cavity. When an axial force is exerted onto the vial adapter 4 towards its front end (e.g. as a result of pushing a vial towards the vial adapter for establishing the transfer position), the front end of the first cylindrical protrusion 48 of the vial adapter 4 will abut against the upright front wall 19 of the first cavity 18 so that the position of the vial adapter 4 in axial direction is fixed and precisely defined at least by the front wall 19. As can be concluded from FIGS. 5*a* and 5*b*, the position of the vial adapter 4 in axial direction may additionally be fixed or defined by abutment of the upper surface of the second cylindrical protrusion 50 against the first stop surface 20 and of the upper surface of the coupling body 42 against the second stop surface 23. In the intermediate position that will be explained hereinafter in more detail, the vial adapter 4 may be fully accommodated in the cavities of the vial adapter cavity 12.

As shown in FIGS. 5*a* and 5*b*, the bottom end of the skirt 60 of the coupling body 40 may also extend into an additional cavity 16 (hereinafter also named second lateral cavity 16) provided in the tray member 10, which has a larger diameter than the third cavity 24 of the vial adapter cavity 12 and thus exposes the bottom end of the skirt 60 of the coupling body 40 a little, so that the resilient legs 61 may flex more easily and unhindered radially outward when coupling body 42 begins to be locked onto the front end of a vial. For this purpose, the bottom end of the skirt 60 preferably does not up to the bottom of the widened second lateral cavity 16. The second lateral cavity 16 may also serve to ease insertion of the vial adapter 4 from vertically above into the vial adapter cavity 12, e.g. by means of the fingers of a user or grippers of a robot.

As shown in FIG. 2*a*, the bottoms 18*a*, 22, 25 of the cavities 18, 21, 24 of the vial adapter cavity 12 are curved, with a radius of curvature corresponding to the outer radius of the corresponding cylindrical portion 48, 50, 42 of the vial adapter 4 to be accommodated therein. The cylindrical portion 48, 50, 42 may serve for positioning the vial adapter in a direction perpendicular to the axial direction of the vial adapter. As shown in FIG. 2*a*, the upper side-walls 18*b*, 22*a*, 25*a* of the cavities 18, 21, 24 of the vial adapter cavity 12 may be planar and extend perpendicular to the upper surface 10*a* of the tray member 10.

Figure 2B:
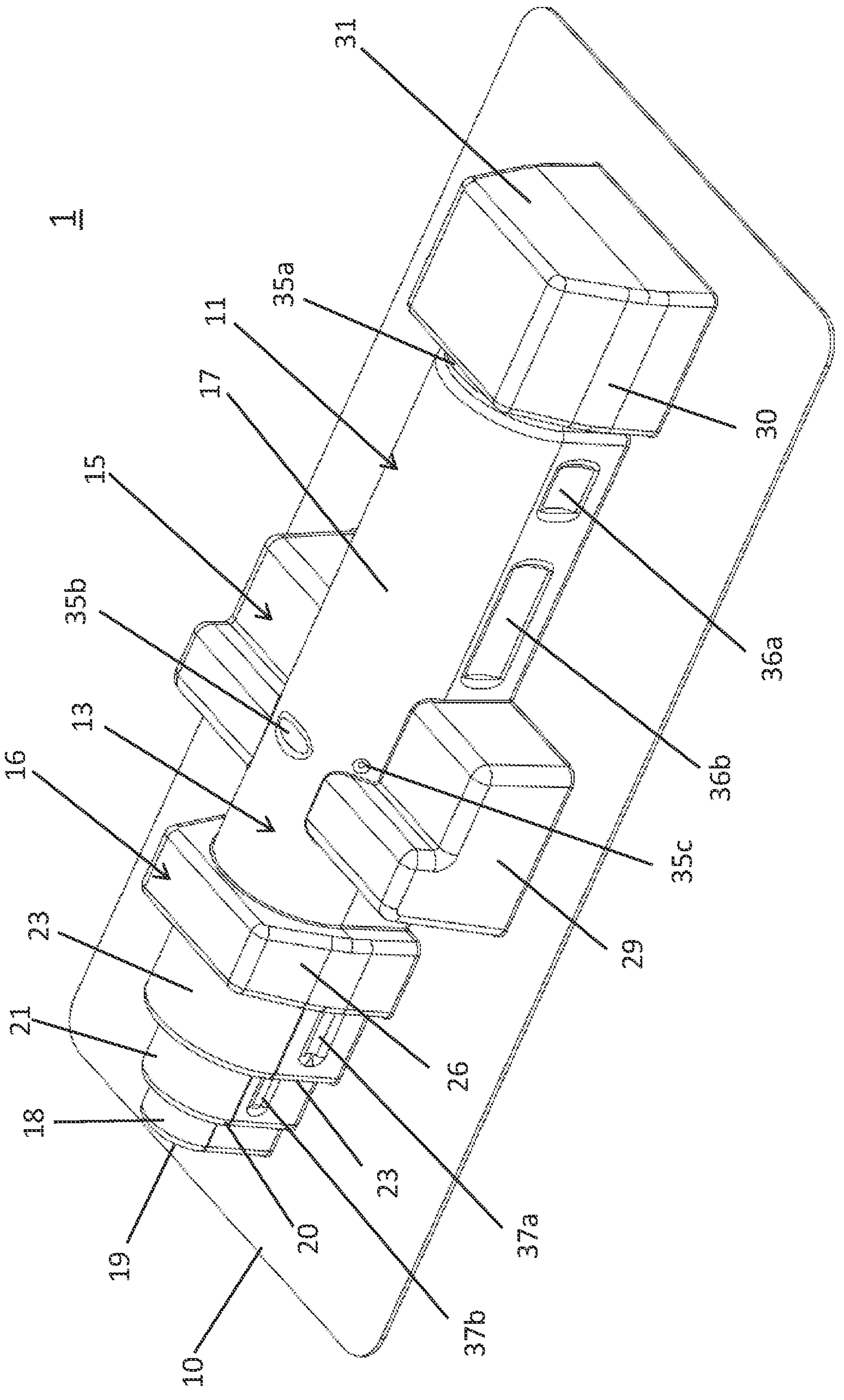
Figure 2C:
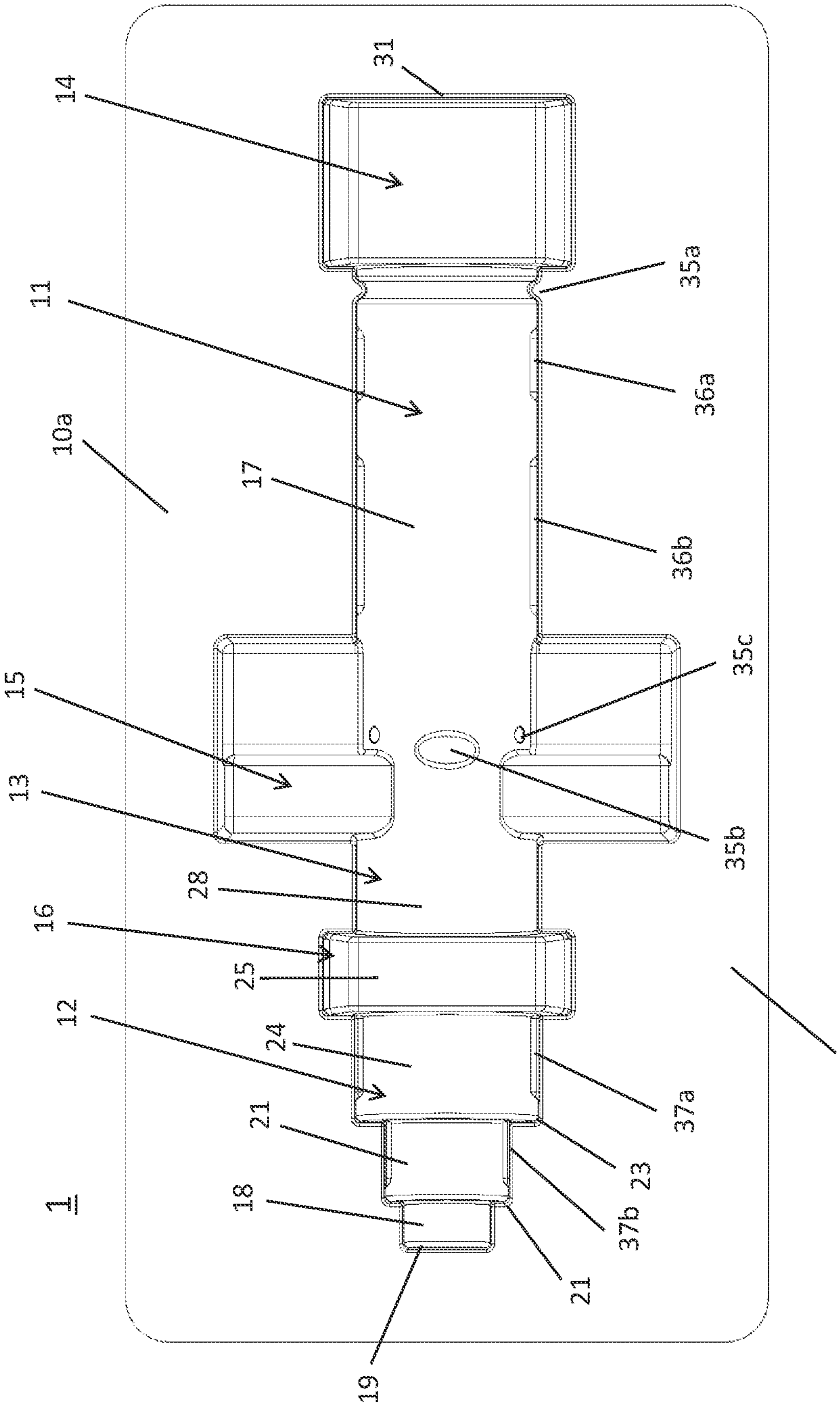
Figure 2D:
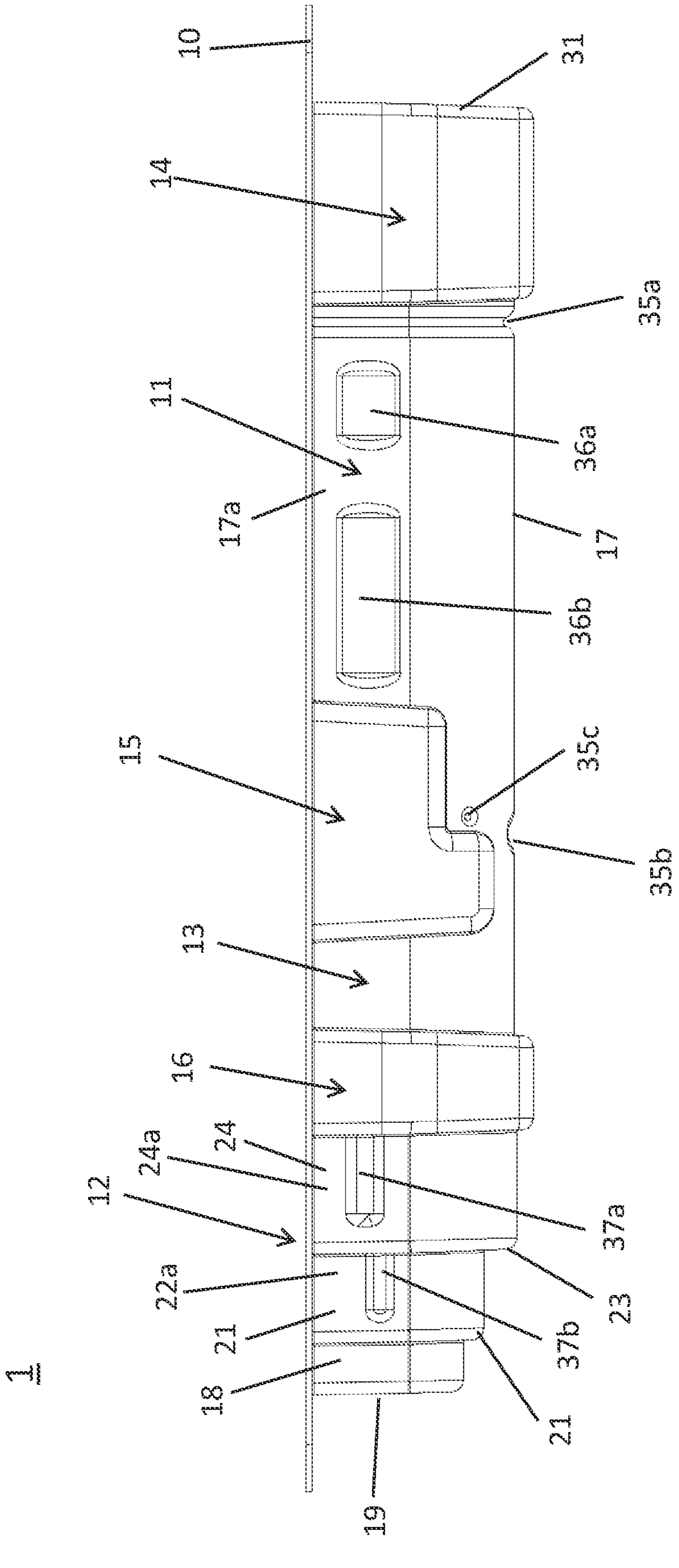

As shown in FIGS. 2*a* and 2*d*, a pair of front retaining members 37*b* is formed on the opposite upper side-walls 22*a* of the second cavity 21 to retain the vial adapter in the vial adapter cavity 12 in axial direction. The front retaining members 37*b* may also serve for keeping the vial adapter 4 pushed downward toward the bottom of the vial adapter cavity 12 in the intermediate position. Additionally, or as an alternative, a second pair of rear retaining members 37*a* may be formed on the opposite upper side-walls 24*a* of the third cavity 24 to retain the vial adapter in the vial adapter cavity 12 in axial direction. The second pair of rear retaining members 37*a* may also serve for keeping the vial adapter 4 pushed downward toward the bottom of the vial adapter cavity 12 in the intermediate position. To enable an unhindered flexure of the resilient legs 61 of the coupling body 40 in the widened second lateral cavity 16, the rear retaining members 37*a* extend only along the upper portion of the coupling body 40.

As shown in FIG. 5*c*, the retaining members 37*a*, 37*b* are preferably formed integrally with the upper side-walls 22*a*, 25*a* of the cavities 21, 24 of the vial adapter cavity 12. More specifically, the retaining members 37*a*, 37*b* may be formed as convexly curved protrusions protruding from the upper side-walls 22*a*, 25*a* of the cavities 21, 24 at a height that is larger than the height h1 of a center line CL of the vial adapter 4 above the bottom of the vial adapter cavity 12. Thus, a certain force component always prevails to push the vial adapter 4 towards the bottom of the vial adapter cavity 12 when accommodated therein in the intermediate position. When a vial adapter 4 is inserted from above into a vial adapter cavity 12 for storage or in preparation to establish the transfer position by axial displacement, the vial adapter 4 will be locked by the retaining members 37*a*, 37*b* in the vial adapter cavity 12 at least in a direction perpendicular to the center line CL of the vial adapter, to thereby define an orientation of the vial adapter 4 in parallel with the bottom of the vial adapter cavity 12 and to define the level h1 of the center line CL in the intermediate position. As shown in FIG. 5*c*, when the vial adapter 4 is accommodated in the vial adapter cavity 12, it preferably does not protrude beyond the upper surface 10*a* of the tray member 10 so that the vial adapter cavity can be sealed by bonding a sealing foil on the upper tray surface 10*a*. Locking of the vial adapter 4 by the retaining members 37*a*, 37*b* in the vial adapter cavity 12 may also be sufficient to define the position of the vial adapter 4 in axial direction.

As shown in FIG. 2*a*, the tray member 10 further comprises a vial cavity 11 for accommodating a vial (not shown) spaced apart from the vial adapter and in axial alignment with the vial adapter in the intermediate position. The term 'spaced apart' means that in the intermediate position, which will be explained hereinafter in more detail, the piercing mandrel 57 of the vial adapter 4 is not yet in contact with the upper surface of the stopper of the vial 7, which means that a certain gap exists between the bottom end of the skirt 60 and the metal cap 77 of the vial 7, as shown in FIG. 3*a*. In the intermediate position, the side surface of the metal cap 77 of the vial 7 may extend slightly into an intermediate cavity 13 provided between the vial adapter 12 and the vial cavity 11. The width of the intermediate cavity 13 may correspond to the outer diameter of the metal cap 77 so that the vial 7 is additionally guided by the side-walls 27 of the intermediate cavity 13 in the final stage of the piercing mandrel 57 piercing the stopper of the vial. Of course, the width of the intermediate cavity 13 may also be a little larger than the outer diameter of the metal cap 77.

As shown in FIG. 2*a*, the vial cavity 11 may have an inner profile corresponding to the outer contour of the vial body 70 (cf. FIG. 3*a*) of the vial to be accommodated in the vial cavity 11. More specifically, the vial cavity 11 may have a curved bottom having a radius of curvature that corresponds to the outer radius of the vial body 70. As shown in FIGS. 2*a* and 2*d*, the upper side-walls 17*a* of the vial cavity 11 may be planar and extend perpendicular to the upper surface 10*a* of the tray member 10. As shown in FIGS. 2*a* and 2*d*, a pair of front vial retaining members 36*b* is formed on the opposite upper side-walls 17*a* of the vial cavity 11 to retain the vial in the vial cavity 11 in the intermediate position. The front vial retaining members 36*b* may also serve to push the vial body downward toward the bottom 17 of the vial cavity 11 to define the height of the center line of the vial in the intermediate position. Additionally, a second pair of rear vial retaining members 36*a* may be formed on the opposite upper side-walls 17*a* of the vial cavity 11 to retain the vial adapter in the vial cavity 11 in the intermediate position. The rear vial retaining members 36*a* may also serve to push the vial body downward toward the bottom 17*a* of the vial adapter cavity 11 to define the height of the center line of the vial in the intermediate position.

As shown in FIG. 5*d*, the retaining members 36*a*, 36*b* are preferably formed integrally with the upper side-walls 17*a* of the vial cavity 11. More specifically, the retaining members 36*a*, 36*b* may be formed as convexly curved protrusions protruding from the upper side-walls of the vial cavity at a height h2 that is larger than the height h1 of a center line CL of the vial body 70 above the bottom 17 of the vial cavity 11. Thus, a certain force component always may prevail to push the vial body 70 towards the bottom 17 of the vial cavity 11 when accommodated therein in the intermediate position. When a vial 7 is inserted from above into a vial cavity 11 for storage or positioning, the vial 7 will be locked by the retaining members 36*a*, 36*b* in the vial cavity 11 at least in a direction perpendicular to the center line CL of the vial body 70, to thereby define an orientation of the vial 7 in parallel with the bottom of the vial cavity 11 and in axial alignment with the vial adapter accommodated in the vial adapter cavity in the intermediate position. As shown in FIGS. 5*c* and 5*d*, when the vial body 70 is accommodated in the vial cavity 11, it may not protrude beyond the upper surface 10*a* of the tray member 10 so that the vial cavity 11 may be sealed by a packaging foil bonded on the upper surface of the tray member 10. Locking of the vial body 70 by the retaining members 36*a*, 36*b* in the vial cavity 11 may also be sufficient to define the position of the vial in axial direction.

As shown in FIG. 2*d*, movement limiting protrusions 35*a*, 35*b* may be provided in the vial cavity 11 near the rear end of the vial cavity 11 and near the position of the transition between the vial body 70 and the vial shoulder 73 (see FIG. 3*a*), for defining the position of the vial in axial direction even more precisely by abutment of protrusions in the vial cavity 11 with the bottom and shoulder of the vial, respectively. Moreover, additional movement limiting protrusions 35*c* may be provided on the side surfaces of the vial adapter cavity 11, in particular at the front end thereof.

As shown in FIG. 4*a*, the vial body 70 may be accommodated in the vial cavity 11 in the storage position with a certain play in axial direction, but the vial body 70 may also be accommodated in the vial cavity 11 in the storage position without play in axial direction. The movement limiting protrusions 35*a*, 35*b* and 35*c* may be formed integrally with the bottom or side-walls of the vial cavity 11, and are preferably formed in the bottom 17 of the vial cavity 11, as shown in FIG. 2*d*. The movement limiting protrusions 35*a*, 35*b*, 35*c* may be formed as convex bulges protruding a little into the vial cavity 11. The rear movement limiting protrusion 35*a* may be U-shaped to extend along the entire rear end of the vial cavity 11, as shown in FIG. 2*a*. As the vial body 70 will slide over the front movement limiting protrusion 35*b* on its way towards the transfer position, the front movement limiting protrusion 35*b* may be relatively shallow and thin so that it can be pressed down easily by the vial body 70. As shown in FIGS. 2*a* and 2*d*, the front movement limiting protrusion 35*b* may be disposed in the region of the intermediate cavity 13.

FIGS. 2*b* and 2*c* show the tray 1 in a perspective bottom view and side view, respectively. The tray member 10 is preferably made of plastic material, in particular by vacuum thermoforming or pressure thermo-forming of a thin plastic sheet or by means of plastic injection molding, and preferably all of the retaining and movement limiting members 19, 37*a*, 37*b*, 35*a*, 35*b*, 35*c*, 36*a*, 36*b* are formed integrally with the tray member 10. Any other materials may be used as well, however. In particular, the tray member may also be made of paper or cardboard. A thin film of plastic or bioplastic may be arranged on inner surfaces of the vial adapter cavity 12 and vial cavity 11 to enable even the storage of the vial adapter and vial in the cavities 11, 12 under sterile conditions. DE 102011122211 A1 discloses an example of such a compound packaging material including a substrate made of paper or cardboard that is coated by a thin film of plastic or bioplastic, and the whole contents of DE 102011122211 A1 is hereby incorporated by reference.

FIG. 3*a* shows a packaging unit 9 according to the present invention, consisting of a tray 1 that stores a vial adapter and a vial in the manner outlined above and is sealed by a packaging foil 8. The packaging foil 8 may seal the whole tray together with the vial adapter and vial in a sterile manner against the environment. For this purpose, the packaging foil 8 may be adhesively bonded onto the planar upper surface of the tray 1. As an alternative the tray 1 may be accommodated in a sealed pouch formed by the packaging foil 8. The packaging foil 8 may be gas-permeable, in particular a Tyvek®-foil, to enable a steam sterilization of the tray 1, vial and vial adapter by a gas flowing through the packaging foil 8.

FIG. 3*a* shows the packaging unit with the vial and vial adapter positioned in an intermediate position in which the vial adapter is positioned inside the vial adapter cavity in a fixed position and predetermined orientation while the vial is positioned spaced apart from the vial adapter and in axial alignment with the vial adapter. In this intermediate position the piercing mandrel 57 is yet spaced apart to the outer surface of the vial stopper and does not pierce it. From this intermediate position the transfer position, in which the vial adapter is locked onto the front end of the vial, may be established by a relative displacement of the vial and vial adapter in axial direction. More specifically, in the preferred embodiments of the present invention the vial adapter is not moved whereas the vial is pushed in axial direction towards the vial adapter until the vial adapter is locked on the front end of the vial and piercing mandrel has pierced the vial stopper for liquid transfer. In the first embodiment shown in FIG. 3*a*, the intermediate position of both the vial adapter and vial is identical with the storage position of both the vial adapter and vial.

For coupling the vial adapter 4 with the vial 7, firstly the packaging foil 8 needs to be removed from the tray 1. FIG. 4*a* is a cross-sectional view of the tray 1 with the vial adapter 4 and the vial 7 in the intermediate position after removal of the packaging foil 8. In the intermediate position, the vial adapter 4 and the vial 7 are kept spaced apart from each other in a fixed positional relationship and in axial alignment, which means that the center line of the vial adapter 4 will coincide with the center line of the vial 7.

For initializing the coupling of the vial adapter 4 with the vial 7, the vial 7 is pushed in axial direction towards the vial adapter 4, as shown in FIGS. 3*b* and 4*b*. For this purpose, a user's finger or a member of a robot may push the bottom 71 of the vial 7 in the direction of the vial adapter 4. To ease access to the bottom 71 of the vial 7 to a user or robot, the rear end cavity 14 may be provided that may be relatively deep and extend even a little beyond the bottom 17 of the vial cavity 11. When the vial 7 is pushed toward the vial adapter 4, the vial body 70 pushes down the front movement limiting protrusion 35*b*. As shown in FIG. 5*e*, during this axial movement of the vial 7 towards the vial adapter 4, the axial alignment of the center axis CL of the vial 7 with the center axis CL of the vial adapter 4 is maintained because the retaining protrusions 36*a*, 36*b* of the vial cavity 11 continue pushing down the vial body 70 towards the bottom 17 of the vial cavity 11 and because the retaining protrusions 37*a*, 37*b* of the vial adapter cavity 12 (see FIG. 3*a*) push down the vial adapter towards the bottom of the vial adapter cavity. The metal cap 77 of the vial 7 thus enters the region of the intermediate cavity 13. Finally, the vial 7 reaches the position shown in FIG. 4*b*, in which the piercing mandrel 57 is about to come in contact with the upper surface of the stopper 76 to start piercing the stopper 76. In this position, the axial alignment of the vial 7 with the vial adapter 4 is maintained at least by the front vial retaining protrusion 36*b* and preferably also by the rear vial retaining protrusion 36*a*.

The piercing mandrel 57 of the vial adapter 4 will thus start piercing the stopper 76 of the vial at its center. When the vial adapter 7 is pushed further toward the vial adapter 4, the bottom bevels of the protrusions 63 of the resilient legs 61 will finally slide along the outer edge of the metal cap 77 of the vial 7 and thus start spreading the resilient legs 61 apart. At the same time, the piercing mandrel 57 will start piercing or puncturing the elastomeric stopper 76 of the vial 7. The piercing mandrel 57 thus assists in maintaining the axial alignment between the vial 7 and vial adapter 4, so that the rear vial retaining protrusions 36*a* may finally get out of contact with the outer surface of the vial body 70. When the vial 7 is pushed further toward the vial adapter 4, finally the locking protrusions 63 of the vial adapter will grip behind the bottom edge of the metal cap 77 of the vial 7 and the piercing mandrel 57 will have fully penetrated or punctured the vial stopper 76, thus enabling a liquid transfer into and/or out of the vial 7 in the transfer position shown in FIG. 4*c*.

In the transfer position of FIG. 4*c* the assembly consisting of the vial adapter 4 locked onto the front end of the vial 7 can be removed from the tray 1, as shown in FIG. 3*d*. Gripping of the assembly is eased by the first lateral cavity

15, because the outer surface of the vial body 70 is exposed in this first lateral cavity 15 in the transfer position and may be easily gripped by the fingers of a user or by manipulating members of a robot, such as grippers. FIG. 3*d* shows the assembly after removal from the tray 1.

As can be concluded from FIG. 3*a*, the first lateral cavity 15 may also serve for enabling access to the front end of the vial body 70 by means of the forefinger and middle finger of a user or by means of grippers of a robot, so that the vial body 70 can be gripped and clamped to thus drive the axial displacement of the vial 7 towards the vial adapter 4 from the intermediate position shown in FIG. 3*a* to the transfer position shown in FIG. 3*c*. This axial displacement by additionally be driven by a user's thumb contacting the bottom 71 of the vial 7 via the rear cavity 14.

As the vial adapter 4 and the vial 7 may be stored in the sterile packaging unit under sterile conditions, the assembly is ready for use after removal from the tray 1, and, if required, only the front end of the vial adapter 4 needs to be disinfected again, e.g. by means of a disinfecting swab, before coupling the vial adapter 4 with a medical device, such as a syringe by means of the thread 43. The transfer position may be obtained quickly and reliably, because the tray 1 enables an intuitive operation and because the axial alignment between the vial adapter 4 and vial 7 can be maintained reliably during all stages of operation.

The above description has assumed the preferred case that the vial adapter 4 rests stationary in the vial adapter cavity 12, while its orientation is maintained by means of the vial adapter retaining protrusions 37*a*, 37*b*, as outlined above. However, as will become apparent to the skilled person when studying the above description, the transfer position may also be reached starting with the intermediate position by any other suitable relative motion between the vial adapter 4 and vial 7, including the extreme reverse case that the vial 7 is kept stationary in the vial cavity while the vial adapter 4 is pushed toward the stationary vial 7 and including 'mixed cases' where both the vial 7 and the vial adapter 4 are moved in axial direction towards each other. During the axial displacement from the intermediate position to the final transfer position, preferably both the vial adapter and the vial do not move in a direction perpendicular to the axial direction.

FIGS. 6*a*-6*c* show a tray according to a second embodiment of the present invention. Different to the aforementioned first embodiment, the front movement limiting protrusions 35*b* are formed on side-surfaces of the vial cavity 11 at its front end. The upper side-surfaces of all cavities of the tray 1 may be slanted outward by a small acute angle to enable stacking of a plurality of such trays 1 after use to ease the transport of such trays back to a manufacturer or supplier of vials in a stapled, more compact configuration. When a plurality of such trays 1 are stapled one above the other, the protrusions 37*a*, 37*b*, 36*a*, 36*b*, 35*a* automatically serve for maintaining a certain gap between the trays 1 to ease separation of the trays 1. As shown in FIG. 6*a*, additional spacers 38, formed as protrusions, may be provided on the upper side-surfaces of one or several cavities of the tray 1, to maintain the gaps between the trays in a stapled configuration.

FIG. 7*a* shows a sterile packaging unit 9 with a tray 1 according to a third embodiment of the present invention in a position used for long-time storage of the vial and vial adapter. Also in the third embodiment, the storage position corresponds to the intermediate position. In the third embodiment, the vial adapter cavity 12 is sealed by means of a second packaging foil against the remainder of the tray 1, preferably in a sterile manner. The whole tray is sealed against the environment, preferably in a sterile manner, by means of a packaging foil 8 that is bonded on the upper surface of the tray 1. Different to the previous embodiments, the front end 32 of the first lateral cavity 15 is slanted under an acute angle, which is e.g. in the range of about 20 degrees, relative to a normal on the upper surface of the tray 1. A U-shaped passage 33 is formed in the intermediate cavity 13, which is configured so that the front end of the vial including the metal cap 77 may be pushed through and which is sealed against the remainder of the tray 1 by means of the second packaging foil 8*a*.

For establishing the transfer position, first the packaging foil 8 needs to be removed, as shown in FIG. 7*b*, so that the vial 7 and in particular the upper surface of the vial stopper is exposed and may be disinfected, if necessary, by means of a disinfecting swab, before coupling the vial adapter to the vial.

FIG. 7*c* shows the front end of the tray 1 with the vial adapter cavity 12 on a larger scale. The second packaging foil 8*a* is adhesively bonded along the bonding line 8*c* to the upper surface of the tray 1 and the slanted front end 32 of the first lateral cavity 15. The bonding line 8*c* extends the entire perimeter of the vial adapter cavity 12, so that the vial adapter cavity 12 can be sterile sealed, if required. To ease peeling-off the second packaging foil 8*a*, a corner portion 8*b* of the second packaging foil 8*a* is not bonded on the upper surface of the tray 1.

After peeling-off the second packaging foil 8*a*, both the vial adapter 4 and the vial 7 are partially exposed in the intermediate position shown in FIG. 7*d*, and for establishing the transfer position and locking the vial adapter 4 onto the front end of the vial 7, the vial 7 only needs to be displaced in axial direction, guided at least by the front vial retaining protrusions 36*b* of the vial cavity 11, as outlined above. Finally, the assembly consisting of the vial adapter 4 locked onto the front end of the vial 7 can be removed from the tray, as outlined above.

FIG. 8*a* shows a sterile packaging unit 9 with a tray 1 according to a fourth embodiment of the present invention in a position used for long-time storage of the vial 7 and vial adapter 4.

Different to the previous embodiments, the storage position of the vial adapter 4 is different to the intermediate position. As shown in FIG. 8*a*, the tray 1 includes a vial adapter tray member 100 that includes a vial adapter storage cavity 101 used for long-time storage of the vial adapter 4. In this embodiment the vial adapter tray member 100 is connected with the tray 1 via a hinge 102. Preferably, the vial adapter tray member 100 and the tray 1 are integral, and the hinge 102 may be a film hinge formed integral with the vial adapter tray member 100 and tray 1. In the storage position, the whole packaging unit 9 may be sealed against the environment, preferably under sterile conditions, by means of a packaging foil 8 bonded on the upper surfaces of the vial adapter tray member 100 and tray 1.

After removal of the packaging foil 8, at least the vial 7 in the vial cavity 11 may be exposed partially, as shown in FIG. 8*b*. Preferably, in the fourth embodiment the vial adapter storage cavity 101 is separately sealed against the remainder of the tray by means of a second packaging foil 8*a*, preferably under sterile conditions. As shown in FIG. 8*b*, the second packaging foil 8*a* may be bonded on the upper surface of the vial adapter tray member 100.

After peeling-off the second packaging foil 8*a*, both the vial adapter 4 and the vial 7 are partially exposed in the position shown in FIG. 8*c*. In order to transfer the vial adapter 4 into the vial adapter cavity 12 of the tray 12, the vial adapter tray member 100 is pivoted about the hinge 102 until the upper surfaces of the vial adapter tray member 100 and tray 1 are flush with each other and the vial adapter storage cavity 101 is positioned vertical above the vial adapter cavity 12, as shown in FIG. 8*d*. As the vial adapter 4 is not locked in the vial adapter storage cavity 101 it will fall downward into the vial adapter cavity 12 of the tray 1, as shown in FIG. 8*e*. Then, the vial adapter tray member 100 can be pivoted backward about the hinge 102 to reach the position shown in FIG. 8*f*. In this position it might be necessary to push the vial adapter 4 fully into the vial adapter cavity 12, e.g. by means of the finger of a user or a member of a robot, to overcome the small resistance force provided by the vial adapter retaining protrusions 37*a*, 37*b* of the vial adapter cavity 12. Finally, the intermediate position will be established, in which the vial adapter 4 is positioned inside the vial adapter cavity 12 in a fixed position and predetermined orientation, retained in the vial adapter cavity 12 by the vial adapter retaining protrusions 37*a* and 37*b*, while the vial 7 is positioned spaced apart from the vial adapter 4 and in axial alignment with the vial adapter 4, as shown in FIG. 8*f*. For the transfer of the vial adapter 4 from the intermediate position to the transfer position, the vial 7 simply needs to be displaced in axial direction towards the vial adapter 4, as outlined above.

FIG. 9 shows a modification of the packaging unit of FIG. 8*a*. Different to the packaging unit of FIG. 8*a*, in the packaging unit 9 of this embodiment only the vial adapter storage cavity 101 is sealed against the environment by a packaging foil 8*a* that is bonded on the upper surface of the vial adapter tray member 100 only, preferably under sterile conditions. The packaging unit 9 of this embodiment can be delivered to customers in the position shown in FIG. 9, or as an alternative without the vial 7. To establish the transfer position, then first the vial 7 needs to be inserted into the vial cavity 11 and locked therein by means of the vial retaining protrusions 36*a* and 36*b*. If necessary, the upper surface of the vial stopper, which is exposed in the position shown in FIG. 9, may be disinfected, e.g. by means of a disinfecting swab, before coupling the vial adapter to the vial. The position shown in FIG. 9 corresponds to that shown in FIG. 8*b* and explained above. In this position, the vial adapter 4 is stored in a storage position in the vial adapter storage cavity 101, whereas the vial 7 is accommodated in the vial cavity 11 already in its intermediate position. To establish the transfer position and couple the vial adapter and the vial, the sequence of methods steps outlined above with reference to FIGS. 8*c*-8*f* needs to be performed.

FIGS. 10*a* and 10*b* show a packaging unit with a tray according to a further embodiment of the present invention. Here, a tray member insert 100 is provided as a separate member that can be inserted into a cavity 12*a* of the tray 1. According to this embodiment, the vial adapter 4 is stored in the cavity 12 of the insert 100 and sealed against the environment by a packaging foil 8*a*, preferably in a sterile manner. More specifically, the packaging foil 8*a* is bonded on the upper surface of the insert 100 and the slanted front wall 32. When the insert 100 is fully inserted into the cavity 12*a* of the tray 1, the vial adapter will be automatically disposed in the intermediate position outlined above, in which the vial adapter 4 is positioned inside the vial adapter cavity 12 of the insert 100 in a fixed position and predetermined orientation, retained by vial adapter retaining protrusions, while the vial 7 is positioned spaced apart from the vial adapter 4 and in axial alignment with the vial adapter 4. To establish the transfer position and couple the vial adapter 4 and the vial 7, the vial 7 simply needs to be pushed in axial directions towards the vial adapter 4 as outlined above. If necessary, the upper surface of the vial stopper, which is exposed in the position shown in FIG. 10*b*, may be disinfected, e.g. by means of a disinfecting swab, before coupling the vial adapter 4 to the vial 7. According to this embodiment, the vial adapter 4 may be supplied by a manufacturer as a separate component, already packaged in the specifically designed insert 100. Or, the vial adapter 4 may be supplied also by the manufacturer of the vials already packaged in the specifically designed insert 100. The tray 1 may be stored or reused at the side of the customer, and the customer may insert the vial 7 into vial cavity 11 of the tray 1 on his own. Or, the tray 1 together with the vial 7 retained in the vial cavity 11 may be supplied by the manufacturer of the vial to the customer.

As will become apparent to the skilled person when studying the above description, a tray according to the present invention may be used for the storage/positioning of any kind of transfer adapter enabling a liquid transfer into and/or out of a medical container and for the storage/positioning of any other kind of medical container except vials, such as cartridges or syringe bodies.

Of course, a vial adapter as outlined above may also be coupled with additional units for liquid transfer when positioned/stored in a tray according to the present invention. As an example for such a combination of a vial adapter with an additional unit, FIG. 1*c* shows a vial adapter 4, which is coupled with a pump dispenser 5. Such a combined vial adapter unit may be positioned/stored in the same manner, as outlined above for the vial adapter itself, in a tray according to the present invention. As shown in FIG. 1*c*, the vial adapter comprises a coupling portion 65*a* configured for coupling with the additional unit, namely in this case with the pump dispenser 5. The coupling portion 65*a* may be a cylindrical portion with a thread on its outer surface for screwing on the pump dispenser 5. At its front end, the vial adapter 4 of FIG. 1*c* further comprises a finger rest 65*b* so that the vial adapter 4 together with the pump dispenser 5 may be grasped easily. The pump dispenser 5 comprises a pump dispenser main body 65*c*, which may include a standard pumping mechanism, and a pump dispenser spray unit 65*d*, which may at the same time serve as an operating button for operating the pumping mechanism by pushing down the pump dispenser spray unit 65*d* repeatedly.

While the preferred embodiments of the present invention have been described so as to enable one skilled in the art to practice the device of the present invention, it is to be understood that variations and modifications may be employed without departing from the concept and intent of the present invention as defined in the appended claims. Accordingly, the preceding description is intended to be exemplary and should not be used to limit the scope of the invention. The scope of the invention should be determined only by reference to the appended claims.

LIST OF REFERENCE NUMERALS

1 tray
4 vial adapter
5 pump dispenser
7 vial
8 foil
8*a* second foil
8*b* unbonded corner of second foil 8*a*
8*c* bonding line
9 combined packaging unit

10 tray member
10*a* upper surface of tray member 10
11 vial cavity
12 vial adapter cavity
12*a* cavity for accommodating tray member insert 100
12*b* slanted partition
12*c* bottom
13 intermediate cavity
14 rear end cavity
15 first lateral cavity
16 second lateral cavity
17 bottom of vial cavity 16
17*a* upper side-wall of vial cavity 16
18 first cavity
18*a* bottom of first cavity 18
18*b* upper side-wall of first cavity 18
19 front wall
20 first stop surface
21 second cavity
22 bottom of second cavity 21
22*a* upper side-wall of second cavity 21
23 second stop surface
24 third cavity
25 bottom of third cavity 24
25*a* upper side-wall of third cavity 24
26 side-wall of second lateral cavity 16
27 side-wall of intermediate cavity 13
28 bottom of intermediate cavity 13
29 side-wall of first lateral cavity 15
30 side-wall of rear end cavity 14
31 rear wall
32 slanted partition
33 passage
35*a* rear movement limiting protrusion
35*b* front movement limiting protrusion
35*c* front movement limiting protrusion
36*a* rear vial retaining protrusion
36*b* front vial retaining protrusion
37*a* rear vial adapter retaining protrusion
37*b* front vial adapter retaining protrusion
38 spacer
40 valve body
41 connecting ring
42 coupling body
43 thread
44 front opening
45 valve member
46 valve stem
47 central channel
48 first cylindrical portion
49 conical portion
50 second cylindrical portion
51 first step
52 connection region
53 cylindrical wall
54 second step
55 top wall
56 third step
57 piercing mandrel
58 cannula
58*a* mouth of cannula 58
59 transfer channel
60 skirt
61 resilient leg
62 slot
63 locking protrusion
64 bottom end
65*a* coupling portion
65*b* finger rest
65*c* pump dispenser main body
65*d* pump dispenser spray unit
70 vial body
71 vial bottom
72 bottom edge
73 shoulder
74 neck
75 rolled edge of vial
76 rubber stopper
77 metal cap
78 central hole
80 contact region
100 vial adapter tray member/tray member insert
101 vial adapter storage cavity
102 hinge
103 locking protrusion
104 supporting leg
CL center line
h1 height of center line CL over bottom of vial cavity 11
h2 height of contact region 80 over bottom of vial cavity 11

The invention claimed is:

1. A tray (1) for positioning a vial (7) for medical or pharmaceutical applications together with a vial adapter (4) in a fixed positional relationship relative to each other, said vial adapter (4) comprising a piercing mandrel (57) and being configured to be locked to a front end of the vial (7) in a transfer position in which the piercing mandrel (57) pierces a stopper (76) of the vial (7) for transfer of a liquid out of and/or into the vial (7), said tray (1) comprising:

a tray member (10) having a planar upper surface (10*a*), a vial cavity (11) for accommodating at least a portion of the vial (7) and a vial adapter cavity (12) for accommodating at least a portion of the vial adapter (4), wherein the vial cavity (11) and vial adapter cavity (12) are each open toward the planar upper surface (10*a*), the vial adapter cavity (12) and the vial cavity (11) each comprises retaining members (19; 17, 22, 25; 37*a*, 37*b*, 35*a*, 35*b*, 36*a*, 36*b*), which are formed integrally with a side-wall of the vial cavity (11) and vial adapter cavity (12), respectively, wherein the retaining members (19; 17, 22, 25; 37*a*, 37*b*, 35*a*, 35*b*, 36*a*, 36*b*) are configured a) to position the vial adapter (4) and the vial (7) in an intermediate position, in which the vial adapter (4) is positioned in a fixed position and predetermined orientation while the vial (7) is positioned spaced apart from the vial adapter (4) and in axial alignment with the vial adapter (4), and b) to guide a relative movement of the vial (7) and vial adapter (4) from the intermediate position to the transfer position while maintaining the axial alignment of the vial (7) and vial adapter (4) with each other;

wherein the vial cavity (11) further comprises axial position limiting members (35*a*, 35*b*) configured for delimiting an axial movement of the vial (7) inside the vial cavity (11) in the storage position, and the axial position limiting members (35*a*, 35*b*) are more flexible than the retaining members (36*a*, 36*b*) of the vial cavity (11).

2. The tray as claimed in claim 1, wherein the retaining members comprise pairs of protrusions (19, 37*a*, 37*b*, 35*a*,

35*b*, 35*c*, 36*a*, 36*b*) formed on opposite side-walls (21, 24, 17*a*) of the vial adapter cavity (12) and vial cavity (11), respectively, which are configured for contacting side-surfaces of the vial adapter (4) and vial (7), respectively, for positioning the vial adapter (4) and the vial (7).

3. The tray as claimed in claim 2, wherein a height (h2) of contact regions (80) of the protrusions (19, 37*a*, 37*b*, 36*a*, 36*b*) with the side-surfaces of the vial adapter (4) and vial (7), respectively, above a bottom (22, 25, 17) of the vial adapter cavity (12) and vial cavity (11), respectively, is larger than the height of a center line (CL) of the vial adapter (4) and vial (7) above the bottom (22, 25, 17) of the vial adapter cavity (12) and vial cavity (11), and the opposite side-walls (21, 24, 17*a*) on which the protrusions (19, 37*a*, 37*b*, 35*a*, 35*b*, 36*a*, 36*b*) are formed are each upright and planar side-walls.

4. The tray as claimed in claim 2, wherein the vial cavity (11) comprises at least two pairs of protrusions (36*a*, 36*b*) formed on opposite side-walls (21, 24, 17*a*) of the vial cavity (11), and at least one pair of protrusions (36*b*) is in contact with side-surfaces of the vial (7) in the transfer position.

5. The tray as claimed in claim 1, said tray member (10) further comprising guiding protrusions (37*a*, 37*b*, 36*a*, 36*b*) for maintaining the axial alignment between the vial (7) and vial adapter (4) during the relative movement between the vial (7) and the vial adapter (4) in the cavities (11, 12) from the intermediate position to the transfer position.

6. The tray as claimed in claim 1, wherein the vial adapter cavity (12) is configured to keep the vial adapter (4) at a fixed axial position inside the vial adapter cavity (12) and the retaining members of the vial cavity (11) are configured to guide an axial movement of the vial (7) toward the vial adapter (4) from the intermediate position to the transfer position while maintaining the axial alignment of the vial (7) and vial adapter (4) with each other.

7. The tray as claimed in claim 6, wherein the vial adapter (4) has a stepped outer contour and the vial adapter cavity (12) comprises a plurality of cavities (18, 21, 24) of different widths and a plurality of stop surfaces (19, 20, 23) that delimit an axial displacement of the vial adapter (4) away from the vial (7) by abutment with the stepped outer contour of the vial adapter (4).

8. The tray as claimed in claim 1, wherein the tray member (10) further comprises an intermediate cavity (13, 15) formed between the vial adapter cavity (12) and the vial cavity (11), wherein a bottom end (64) of the vial adapter (4) is spaced apart from the front end of the vial (7) in the intermediate position; and the intermediate cavity comprises a portion (15) that is sufficiently wide to enable access to a vial body (70) of the vial (7) by means of fingers of a user or grippers of a robot in the intermediate position for driving the relative movement of the vial (7) and vial adapter (4) and/or for removal of the vial (7) together with the vial adapter (4) locked to the front end of the vial (7) in the transfer position from the tray member (10).

9. The tray as claimed in claim 1, wherein the tray member (10) further comprises a rear end cavity (14), where a bottom (71) of the vial (7) is sufficiently exposed to enable access to the bottom (71) for a finger of a user or a manipulation member of a robot for driving the axial movement of the vial (7) from the intermediate position to the transfer position.

10. The tray as claimed in claim 1, wherein the tray member (10) comprises a vial adapter tray member (100) having a vial adapter storage cavity (101) for long-time storage of the vial adapter (4), wherein the vial adapter storage cavity (101) and the vial adapter cavity (12) is each configured for enabling a transfer of the vial adapter (4) from the vial adapter storage cavity (101) into the vial adapter cavity (12) to position the vial adapter (4) in the intermediate position.

11. The tray as claimed in claim 10, wherein the vial adapter tray member (100) is connected with the tray member (10) via a hinge (102) so that the vial adapter tray member (100) can be pivoted about the hinge (102) for positioning the vial adapter storage cavity (101) vertical above the vial adapter cavity (12) for enabling a transfer of the vial adapter (4) from the vial adapter storage cavity (101) into the vial adapter cavity (12) to position the vial adapter (4) in the intermediate position.

12. The tray as claimed in claim 10, wherein the vial adapter tray member is a tray member insert (100) that includes the vial adapter cavity (12) and the tray member (10) comprises a positioning cavity (12*a*), wherein the tray member insert (100) is configured to be inserted into the positioning cavity (12*a*) of the tray member (10) as an independent member, and the tray member insert (100) comprises locking means (103) for locking the tray member insert (100) to the tray member (10), for positioning the tray member insert (100) in the positioning cavity (12*a*) of the tray member (10), and wherein when the tray member insert (100) is inserted into the positioning cavity (12*a*) of the tray member (10), the vial adapter (4) is positioned in the intermediate position.

13. A tray (1) for positioning a vial (7) for medical or pharmaceutical applications together with a vial adapter (4) in a fixed positional relationship relative to each other, said vial adapter (4) comprising a piercing mandrel (57) and being configured to be locked to a front end of the vial (7) in a transfer position in which the piercing mandrel (57) pierces a stopper (76) of the vial (7) for transfer of a liquid out of and/or into the vial (7), said tray (1) comprising:

a tray member (10) having a planar upper surface (10*a*), a vial cavity (11) for accommodating at least a portion of the vial (7) and a vial adapter cavity (12) for accommodating at least a portion of the vial adapter (4), wherein the vial cavity (11) and vial adapter cavity (12) are each open toward the planar upper surface (10*a*), the vial adapter cavity (12) and the vial cavity (11) each comprises retaining members (19;

17, 22, 25; 37*a*, 37*b*, 35*a*, 35*b*, 36*a*, 36*b*), which are formed integrally with a side-wall of the vial cavity (11) and vial adapter cavity (12), respectively, wherein the retaining members (19; 17, 22, 25; 37*a*, 37*b*, 35*a*, 35*b*, 36*a*, 36*b*) are configured a) to position the vial adapter (4) and the vial (7) in an intermediate position, in which the vial adapter (4) is positioned in a fixed position and predetermined orientation while the vial (7) is positioned spaced apart from the vial adapter (4) and in axial alignment with the vial adapter (4), and b) to guide a relative movement of the vial (7) and vial adapter (4) from the intermediate position to the transfer position while maintaining the axial alignment of the vial (7) and vial adapter (4) with each other;

wherein the tray member (10) further comprises an intermediate cavity (13, 15) formed between the vial adapter cavity (12) and the vial cavity (11), wherein a bottom end (64) of the vial adapter (4) is spaced apart from the front end of the vial (7) in the intermediate position.

14. The tray as claimed in claim 13, wherein the intermediate cavity comprises a portion (15) that is sufficiently wide to enable access to a vial body (70) of the vial (7) by means of fingers of a user or grippers of a robot in the intermediate position for driving the relative movement of the vial (7) and vial adapter (4) and/or for removal of the vial (7) together with the vial adapter (4) locked to the front end of the vial (7) in the transfer position from the tray member (10).

15. The tray as claimed in claim 13, wherein the retaining members comprise pairs of protrusions (19, 37*a*, 37*b*, 35*a*, 35*b*, 35*c*, 36*a*, 36*b*) formed on opposite side-walls (21, 24, 17*a*) of the vial adapter cavity (12) and vial cavity (11), respectively, which are configured for contacting side-surfaces of the vial adapter (4) and vial (7), respectively, for positioning the vial adapter (4) and the vial (7).

16. The tray as claimed in claim 15, wherein a height (h2) of contact regions (80) of the protrusions (19, 37*a*, 37*b*, 36*a*, 36*b*) with the side-surfaces of the vial adapter (4) and vial (7), respectively, above a bottom (22, 25, 17) of the vial adapter cavity (12) and vial cavity (11), respectively, is larger than the height of a center line (CL) of the vial adapter (4) and vial (7) above the bottom (22, 25, 17) of the vial adapter cavity (12) and vial cavity (11); and the opposite side-walls (21, 24, 17*a*) on which the protrusions (19, 37*a*, 37*b*, 35*a*, 35*b*, 36*a*, 36*b*) are formed are each upright and planar side-walls.

17. The tray as claimed in claim 15, wherein the vial cavity (11) comprises at least two pairs of protrusions (36*a*, 36*b*) formed on opposite side-walls (21, 24, 17*a*) of the vial cavity (11), and at least one pair of protrusions (36*b*) is in contact with side-surfaces of the vial (7) in the transfer position.

18. The tray as claimed in claim 13, said tray member (10) further comprising guiding protrusions (37*a*, 37*b*, 36*a*, 36*b*) for maintaining the axial alignment between the vial (7) and vial adapter (4) during the relative movement between the vial (7) and the vial adapter (4) in the cavities (11, 12) from the intermediate position to the transfer position.

19. The tray as claimed in claim 13, wherein the vial adapter cavity (12) is configured to keep the vial adapter (4) at a fixed axial position inside the vial adapter cavity (12) and the retaining members of the vial cavity (11) are configured to guide an axial movement of the vial (7) toward the vial adapter (4) from the intermediate position to the transfer position while maintaining the axial alignment of the vial (7) and vial adapter (4) with each other; and the vial adapter (4) has a stepped outer contour and the vial adapter cavity (12) comprises a plurality of cavities (18, 21, 24) of different widths and a plurality of stop surfaces (19, 20, 23) that delimit an axial displacement of the vial adapter (4) away from the vial (7) by abutment with the stepped outer contour of the vial adapter (4).

20. The tray as claimed in claim 13, wherein the tray member (10) further comprises an intermediate cavity (13, 15) formed between the vial adapter cavity (12) and the vial cavity (11), wherein a bottom end (64) of the vial adapter (4) is spaced apart from the front end of the vial (7) in the intermediate position; and the intermediate cavity comprises a portion (15) that is sufficiently wide to enable access to a vial body (70) of the vial (7) by means of fingers of a user or grippers of a robot in the intermediate position for driving the relative movement of the vial (7) and vial adapter (4) and/or for removal of the vial (7) together with the vial adapter (4) locked to the front end of the vial (7) in the transfer position from the tray member (10).

21. The tray as claimed in claim 13, wherein the tray member (10) further comprises a rear end cavity (14), where a bottom (71) of the vial (7) is sufficiently exposed to enable access to the bottom (71) for a finger of a user or a manipulation member of a robot for driving the axial movement of the vial (7) from the intermediate position to the transfer position.

22. A tray (1) for positioning a vial (7) for medical or pharmaceutical applications together with a vial adapter (4) in a fixed positional relationship relative to each other, said vial adapter (4) comprising a piercing mandrel (57) and being configured to be locked to a front end of the vial (7) in a transfer position in which the piercing mandrel (57) pierces a stopper (76) of the vial (7) for transfer of a liquid out of and/or into the vial (7), said tray (1) comprising:

a tray member (10) having a planar upper surface (10*a*), a vial cavity (11) for accommodating at least a portion of the vial (7) and a vial adapter cavity (12) for accommodating at least a portion of the vial adapter (4), wherein the vial cavity (11) and vial adapter cavity (12) are each open toward the planar upper surface (10*a*), the vial adapter cavity (12) and the vial cavity (11) each comprises retaining members (19; 17, 22, 25; 37*a*, 37*b*, 35*a*, 35*b*, 36*a*, 36*b*), which are formed integrally with a side-wall of the vial cavity (11) and vial adapter cavity (12), respectively, wherein the retaining members (19; 17, 22, 25; 37*a*, 37*b*, 35*a*, 35*b*, 36*a*, 36*b*) are configured a) to position the vial adapter (4) and the vial (7) in an intermediate position, in which the vial adapter (4) is positioned in a fixed position and predetermined orientation while the vial (7) is positioned spaced apart from the vial adapter (4) and in axial alignment with the vial adapter (4), and b) to guide a relative movement of the vial (7) and vial adapter (4) from the intermediate position to the transfer position while maintaining the axial alignment of the vial (7) and vial adapter (4) with each other;

wherein the tray member (10) comprises a vial adapter tray member (100) having a vial adapter storage cavity (101) for long-time storage of the vial adapter (4), wherein the vial adapter storage cavity (101) and the vial adapter cavity (12) is each configured for enabling a transfer of the vial adapter (4) from the vial adapter storage cavity (101) into the vial adapter cavity (12) to position the vial adapter (4) in the intermediate position.

23. The tray as claimed in claim 22, wherein the vial adapter tray member (100) is connected with the tray member (10) via a hinge (102) so that the vial adapter tray member (100) can be pivoted about the hinge (102) for positioning the vial adapter storage cavity (101) vertical above the vial adapter cavity (12) for enabling a transfer of the vial adapter (4) from the vial adapter storage cavity (101) into the vial adapter cavity (12) to position the vial adapter (4) in the intermediate position.

24. The tray as claimed in claim 22, wherein
the vial adapter tray member is a tray member insert (100) that includes the vial adapter cavity (12) and
the tray member (10) comprises a positioning cavity (12*a*), wherein
the tray member insert (100) is configured to be inserted into the positioning cavity (12*a*) of the tray member (10) as an independent member, and wherein
when the tray member insert (100) is inserted into the positioning cavity (12*a*) of the tray member (10), the vial adapter (4) is positioned in the intermediate position.

25. The tray as claimed in claim 24, wherein the tray member insert (100) comprises locking means (103) for locking the tray member insert (100) to the tray member (10), for positioning the tray member insert (100) in the positioning cavity (12*a*) of the tray member (10).

26. The tray as claimed in claim 25, wherein
the retaining members comprise pairs of protrusions (19, 37*a*, 37*b*, 35*a*, 35*b*, 35*c*, 36*a*, 36*b*) formed on opposite side-walls (21, 24, 17*a*) of the vial adapter cavity (12) and vial cavity (11), respectively, which are configured for contacting side-surfaces of the vial adapter (4) and vial (7), respectively, for positioning the vial adapter (4) and the vial (7); and
the opposite side-walls (21, 24, 17*a*) on which the protrusions (19, 37*a*, 37*b*, 35*a*, 35*b*, 36*a*, 36*b*) are formed are each upright and planar side-walls.

27. The tray as claimed in claim 26, wherein a height (h2) of contact regions (80) of the protrusions (19, 37*a*, 37*b*, 36*a*, 36*b*) with the side-surfaces of the vial adapter (4) and vial (7), respectively, above a bottom (22, 25, 17) of the vial adapter cavity (12) and vial cavity (11), respectively, is larger than the height of a center line (CL) of the vial adapter (4) and vial (7) above the bottom (22, 25, 17) of the vial adapter cavity (12) and vial cavity (11).

28. The tray as claimed in claim 22, said tray member (10) further comprising guiding protrusions (37*a*, 37*b*, 36*a*, 36*b*) for maintaining the axial alignment between the vial (7) and vial adapter (4) during the relative movement between the vial (7) and the vial adapter (4) in the cavities (11, 12) from the intermediate position to the transfer position.

29. The tray as claimed in claim 22, wherein
the vial adapter cavity (12) is configured to keep the vial adapter (4) at a fixed axial position inside the vial adapter cavity (12) and the retaining members of the vial cavity (11) are configured to guide an axial movement of the vial (7) toward the vial adapter (4) from the intermediate position to the transfer position while maintaining the axial alignment of the vial (7) and vial adapter (4) with each other; and
the vial adapter (4) has a stepped outer contour and the vial adapter cavity (12) comprises a plurality of cavities (18, 21, 24) of different widths and a plurality of stop surfaces (19, 20, 23) that delimit an axial displacement of the vial adapter (4) away from the vial (7) by abutment with the stepped outer contour of the vial adapter (4).

30. The tray as claimed in claim 22, wherein
the tray member (10) further comprises an intermediate cavity (13, 15) formed between the vial adapter cavity (12) and the vial cavity (11), wherein a bottom end (64) of the vial adapter (4) is spaced apart from the front end of the vial (7) in the intermediate position; and
the intermediate cavity comprises a portion (15) that is sufficiently wide to enable access to a vial body (70) of the vial (7) by means of fingers of a user or grippers of a robot in the intermediate position for driving the relative movement of the vial (7) and vial adapter (4) and/or for removal of the vial (7) together with the vial adapter (4) locked to the front end of the vial (7) in the transfer position from the tray member (10).

31. The tray as claimed in claim 22, wherein the tray member (10) further comprises a rear end cavity (14), where a bottom (71) of the vial (7) is sufficiently exposed to enable access to the bottom (71) for a finger of a user or a manipulation member of a robot for driving the axial movement of the vial (7) from the intermediate position to the transfer position.

32. A packaging unit (9) for packaging a vial (7) for medical or pharmaceutical applications together with a vial adapter (4), said vial adapter (4) comprising a piercing mandrel (57) and being configured to be locked to a front end of the vial (7) in a transfer position in which the piercing mandrel (57) pierces a stopper (76) of the vial (7) for transfer of a liquid out of and/or into the vial (7),
said packaging unit (9) comprising
a tray (1) for positioning the vial (7) together with the vial adapter (4) in a fixed positional relationship relative to each other, and
a first packaging foil (8), wherein
the tray (1) comprises a tray member (10) having a planar upper surface (10*a*), a vial cavity (11) for accommodating at least a portion of the vial (7) and a vial adapter cavity (12) for accommodating at least a portion of the vial adapter (4), wherein the vial cavity (11) and vial adapter cavity (12) are each open toward the planar upper surface (10*a*), and
the vial adapter cavity (12) and the vial cavity (11) each comprises retaining members (19;
17, 22, 25; 37*a*, 37*b*, 35*a*, 35*b*, 36*a*, 36*b*), which are formed integrally with a side-wall of the vial cavity (11) and vial adapter cavity (12), respectively, configured to position the vial adapter (4) and the vial (7) in an intermediate position, in which the vial adapter (4) is positioned in a fixed position and predetermined orientation while the vial (7) is positioned spaced apart from the vial adapter (4) and in axial alignment with the vial adapter (4) and to guide a relative movement of the vial (7) and vial adapter (4) from the intermediate position to the transfer position while maintaining the axial alignment of the vial (7) and vial adapter (4) with each other, wherein
the vial adapter (4) is accommodated in the vial adapter cavity (12),
the vial (7) is accommodated at least partially in the vial cavity (11) spaced apart from the vial adapter (4), and
the tray member (10) is sealed against the environment by the first packaging foil (8), and
wherein
the tray member (10) comprises a vial adapter tray member (100) having a vial adapter storage cavity (101) for long-time storage of the vial adapter (4), and wherein the vial adapter storage cavity (101) is sealed by a second packaging foil (8*a*).

33. The packaging unit (9) as claimed in claim 32, wherein the first packaging foil (8) is adhesively bonded to the upper surface of the tray member (10) and the second packaging foil (8*a*) is adhesively bonded to an upper surface of the vial adapter tray member (100).

34. The packaging unit (9) as claimed in claim 32, wherein the tray member (10) is made of plastic material by vacuum thermoforming or pressure thermo-forming of a plastic sheet or by means of plastic injection molding and the retaining members (19, 37*a*, 37*b*, 35*a*, 35*b*, 35*c*, 36*a*, 36*b*) are formed integrally with the tray member (10).

35. The packaging unit (9) as claimed in claim 32, wherein the tray member (10) is made of paper or cardboard, a thin film of plastic or bioplastic is arranged on inner surfaces of the vial adapter cavity (12) and vial cavity (11), and the retaining members (19, 37*a*, 37*b*, 35*a*, 35*b*, 35*c*, 36*a*, 36*b*) are formed integrally with the tray member (10).

36. The packaging unit (9) as claimed in claim 32, wherein the retaining members comprise pairs of protrusions (19, 37*a*, 37*b*, 35*a*, 35*b*, 35*c*, 36*a*, 36*b*) formed on opposite side-walls (21, 24, 17*a*) of the vial adapter cavity (12) and vial cavity (11), respectively, which are configured for contacting side-surfaces of the vial adapter (4) and vial (7), respectively, for positioning the vial adapter (4) and the vial (7), and a height (h2) of contact regions (80) of the protrusions (19, 37*a*, 37*b*, 36*a*, 36*b*) with the side-surfaces of the vial adapter (4) and vial (7), respectively, above a bottom (22, 25, 17) of the vial adapter cavity (12) and vial cavity (11), respectively, is larger than the height of a center line (CL) of the vial adapter (4) and vial (7) above the bottom (22, 25, 17) of the vial adapter cavity (12) and vial cavity (11).

37. The packaging unit (9) as claimed in claim 32, said tray member (10) further comprising guiding protrusions (37*a*, 37*b*, 36*a*, 36*b*) for maintaining the axial alignment between the vial (7) and vial adapter (4) during the relative movement between the vial (7) and the vial adapter (4) in the cavities (11, 12) from the intermediate position to the transfer position.

38. The packaging unit (9) as claimed in claim 32, wherein a bottom (17) of the vial cavity (11) is curved with a radius of curvature corresponding to an outer radius of a vial body (70) of the vial (7) and the profile of a bottom (22, 25) of the vial adapter cavity (12) corresponds to an outer profile of the vial adapter (4).

39. The packaging unit (9) as claimed in claim 32, wherein the vial adapter cavity (12) is configured to keep the vial adapter (4) at a fixed axial position inside the vial adapter cavity (12) and the retaining members of the vial cavity (11) are configured to guide an axial movement of the vial (7) toward the vial adapter (4) from the intermediate position to the transfer position while maintaining the axial alignment of the vial (7) and vial adapter (4) with each other.

40. The packaging unit (9) as claimed in claim 39, wherein the vial adapter (4) has a stepped outer contour and the vial adapter cavity (12) comprises a plurality of cavities (18, 21, 24) of different widths and a plurality of stop surfaces (19, 20, 23) that delimit an axial displacement of the vial adapter (4) away from the vial (7) by abutment with the stepped outer contour of the vial adapter (4).

41. The packaging unit (9) as claimed in claim 32, wherein the tray member (10) further comprises an intermediate cavity (13, 15) formed between the vial adapter cavity (12) and the vial cavity (11), wherein a bottom end (64) of the vial adapter (4) is spaced apart from the front end of the vial (7) in the intermediate position.

42. The packaging unit (9) as claimed in claim 32, wherein the tray member (10) further comprises a rear end cavity (14), where a bottom (71) of the vial (7) is sufficiently exposed to enable access to the bottom (71) for a finger of a user or a manipulation member of a robot for driving the axial movement of the vial (7) from the intermediate position to the transfer position.

* * * * *